(12) United States Patent
Ateniese et al.

(10) Patent No.: US 10,243,938 B2
(45) Date of Patent: *Mar. 26, 2019

(54) REWRITABLE BLOCKCHAIN

(71) Applicants: Accenture Global Solutions Limited, Dublin (IE); GSC Secrypt, LLC, Hoboken, NJ (US)

(72) Inventors: Giuseppe Ateniese, Hoboken, NJ (US); Michael T. Chiaramonte, New York, NY (US); David Treat, Ridgefield, CT (US); Bernardo Magri, Rome (IT); Daniele Venturi, Rome (IT)

(73) Assignee: Accenture Global Solutions Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 15/971,777

(22) Filed: May 4, 2018

(65) Prior Publication Data

US 2018/0254887 A1   Sep. 6, 2018

Related U.S. Application Data

(63) Continuation of application No. 15/596,904, filed on May 16, 2017, now Pat. No. 9,967,088.

(30) Foreign Application Priority Data

May 23, 2016 (EP) .................................. 16425044
Aug. 11, 2016 (EP) .................................. 16425086
Feb. 17, 2017 (EP) .................................. 17425018

(51) Int. Cl.
*H04L 29/06* (2006.01)
*H04L 9/32* (2006.01)
(Continued)

(52) U.S. Cl.
CPC .......... *H04L 63/062* (2013.01); *G06F 3/0619* (2013.01); *G06F 3/0622* (2013.01);
(Continued)

(58) Field of Classification Search
CPC ... H04L 9/0637; H04L 9/0841; H04L 9/3226; H04L 9/0894; H04L 9/14; H04L 9/30;
(Continued)

(56) References Cited

U.S. PATENT DOCUMENTS 5,534,855 A * 7/1996 Shockley ................ G06F 21/31
340/5.52
6,108,783 A * 8/2000 Krawczyk ............. H04L 9/3236
380/28

(Continued)

OTHER PUBLICATIONS

Goodman, L.M. "Tezos: A Self-Amending Crypto-Ledger Position Paper", Aug. 3, 2014. (Year: 2014).*

(Continued)

*Primary Examiner* — Darren B Schwartz
(74) *Attorney, Agent, or Firm* — Brinks Gilson & Lione; Daniel H. Broaddus

(57) ABSTRACT

A system includes circuitry for rewriting blockchains in a validity-preserving operation. In some cases, using a key secret held by a trusted party. In some cases, the blockchains may include a series of blocks secured integrity codes that may prevent non-tamper-evident rewrites by non-trusted parties that are not in possession of the key secret. In some cases, the key may allow valid but tamper-evident rewrites of the blockchain by trusted entities. In some cases, integrity outputs may be generated from the integrity codes based on the content of the previous blocks in the series such that attempts by untrusted parties to replace a block may be detected through coding-inconsistencies with other blocks.

30 Claims, 15 Drawing Sheets

US 10,243,938 B2
Page 2

(51) Int. Cl.
| | |
|---|---|
| *H04L 9/08* | (2006.01) |
| *H04L 9/06* | (2006.01) |
| *H04L 9/14* | (2006.01) |
| *G06F 21/64* | (2013.01) |
| *H04L 9/30* | (2006.01) |
| *G06F 3/06* | (2006.01) |
| *G06F 21/53* | (2013.01) |

(52) U.S. Cl.
CPC .......... *G06F 3/0659* (2013.01); *G06F 3/0673* (2013.01); *G06F 21/53* (2013.01); *G06F 21/64* (2013.01); *H04L 9/0618* (2013.01); *H04L 9/0637* (2013.01); *H04L 9/0643* (2013.01); *H04L 9/085* (2013.01); *H04L 9/0841* (2013.01); *H04L 9/0894* (2013.01); *H04L 9/14* (2013.01); *H04L 9/30* (2013.01); *H04L 9/3221* (2013.01); *H04L 9/3226* (2013.01); *H04L 9/3242* (2013.01); *H04L 63/061* (2013.01); *H04L 2209/38* (2013.01); *H04L 2209/46* (2013.01); *H04L 2209/56* (2013.01)

(58) Field of Classification Search
CPC ... H04L 9/0643; H04L 63/062; H04L 9/3221; H04L 63/061; H04L 9/0618; H04L 9/3242; H04L 2209/38; H04L 2209/46; H04L 2209/56; H04L 9/085; G06F 3/0659; G06F 3/0673; G06F 3/0622; G06F 3/0619; G06F 21/64; G06F 21/53
See application file for complete search history.

(56) References Cited

U.S. PATENT DOCUMENTS

| | | | |
|---|---|---|---|
| 6,292,897 B1 | 9/2001 | Gennaro et al. | |
| 7,730,319 B2 | 6/2010 | Razman et al. | |
| 9,436,923 B1 | 9/2016 | Sriram et al. | |
| 9,667,416 B1* | 5/2017 | Machani | H04L 9/0822 |
| 9,679,276 B1* | 6/2017 | Cuende | G06F 17/30949 |
| 9,774,578 B1 | 9/2017 | Ateniese et al. | |
| 9,785,369 B1 | 10/2017 | Ateniese et al. | |
| 9,959,065 B2 | 5/2018 | Ateniese et al. | |
| 9,967,088 B2 | 5/2018 | Ateniese et al. | |
| 9,967,096 B2 | 5/2018 | Ateniese et al. | |
| 2002/0013898 A1* | 1/2002 | Sudia | G06Q 20/02 713/155 |
| 2002/0099946 A1 | 7/2002 | Herbert et al. | |
| 2002/0164033 A1* | 11/2002 | Rajasekaran | H04L 9/085 380/278 |
| 2002/0194209 A1 | 12/2002 | Bolosky et al. | |
| 2004/0107341 A1* | 6/2004 | Hall | H04L 9/0836 713/161 |
| 2007/0223706 A1* | 9/2007 | Gantman | H04L 9/085 380/286 |
| 2007/0226514 A1 | 9/2007 | Maletsky | |
| 2007/0294205 A1 | 12/2007 | Xu et al. | |
| 2008/0104407 A1 | 5/2008 | Horne et al. | |
| 2008/0195583 A1 | 8/2008 | Hsu et al. | |
| 2009/0006853 A1* | 1/2009 | Li | H04L 63/0428 713/176 |
| 2009/0024848 A1 | 1/2009 | Takasugi et al. | |
| 2009/0193256 A1* | 7/2009 | Takenaka | H04L 9/302 713/176 |
| 2009/0271631 A1 | 10/2009 | Teranishi | |
| 2010/0005306 A1 | 1/2010 | Izu et al. | |
| 2010/0037056 A1* | 2/2010 | Follis | G06F 11/1464 713/171 |
| 2010/0046749 A1* | 2/2010 | Hatano | H04L 9/088 380/44 |
| 2010/0110935 A1* | 5/2010 | Tamassia | H04L 63/12 370/256 |
| 2010/0153732 A1* | 6/2010 | Su | G06F 12/1408 713/176 |
| 2010/0169653 A1 | 7/2010 | Takenaka et al. | |
| 2011/0137916 A1* | 6/2011 | Deen | G06F 17/3002 707/747 |
| 2012/0072732 A1* | 3/2012 | Canard | H04L 9/3247 713/176 |
| 2014/0245020 A1* | 8/2014 | Buldas | G06F 21/64 713/177 |
| 2015/0006899 A1* | 1/2015 | Seo | H04L 9/3236 713/176 |
| 2015/0025934 A1* | 1/2015 | Mashima | G06Q 30/0201 705/7.29 |
| 2015/0046337 A1 | 2/2015 | Hu et al. | |
| 2015/0121062 A1* | 4/2015 | Gajek | H04L 63/0471 713/153 |
| 2015/0128283 A1 | 5/2015 | Mashima et al. | |
| 2015/0207625 A1* | 7/2015 | Sathaye | H04L 9/14 726/26 |
| 2015/0244690 A1 | 8/2015 | Mossbarger | |
| 2015/0332283 A1 | 11/2015 | Witchey | |
| 2015/0332395 A1 | 11/2015 | Walker et al. | |
| 2015/0356555 A1 | 12/2015 | Pennanen | |
| 2015/0378842 A1* | 12/2015 | Tomlinson | G06F 21/40 380/28 |
| 2016/0027229 A1* | 1/2016 | Spanos | G07C 13/00 705/51 |
| 2016/0085955 A1 | 3/2016 | Lerner | |
| 2016/0110261 A1* | 4/2016 | Parab | G06F 11/1453 707/692 |
| 2016/0110292 A1 | 4/2016 | Choi et al. | |
| 2016/0125403 A1 | 5/2016 | Hu et al. | |
| 2016/0162897 A1 | 6/2016 | Feeney | |
| 2016/0191243 A1* | 6/2016 | Manning | H04L 9/32 713/168 |
| 2016/0204942 A1* | 7/2016 | Bohli | G06F 21/64 713/168 |
| 2016/0212109 A1 | 7/2016 | Hird | |
| 2016/0212146 A1* | 7/2016 | Wilson | G06F 21/645 |
| 2016/0218879 A1 | 7/2016 | Ferrin | |
| 2016/0292396 A1 | 10/2016 | Akerwall | |
| 2016/0321654 A1 | 11/2016 | Lesavich et al. | |
| 2016/0328424 A1 | 11/2016 | Borley et al. | |
| 2016/0330034 A1* | 11/2016 | Back | G06Q 20/06 |
| 2016/0344737 A1 | 11/2016 | Anton et al. | |
| 2016/0358135 A1 | 12/2016 | Liao et al. | |
| 2016/0358165 A1 | 12/2016 | Maxwell | |
| 2017/0031676 A1 | 2/2017 | Cecchetti et al. | |
| 2017/0034217 A1 | 2/2017 | Anton et al. | |
| 2017/0046693 A1* | 2/2017 | Haldenby | G06Q 20/0655 |
| 2017/0046806 A1* | 2/2017 | Haldenby | G06Q 20/0655 |
| 2017/0048217 A1 | 2/2017 | Biggs et al. | |
| 2017/0109735 A1 | 4/2017 | Sheng et al. | |
| 2017/0132630 A1* | 5/2017 | Castinado | G06Q 20/4014 |
| 2017/0163733 A1 | 6/2017 | Grefen et al. | |
| 2017/0180134 A1* | 6/2017 | King | H04L 9/3247 |
| 2017/0213209 A1 | 7/2017 | Dillenberger | |
| 2017/0220815 A1* | 8/2017 | Ansari | G06F 21/64 |
| 2017/0279774 A1* | 9/2017 | Booz | H04L 67/34 |
| 2017/0330174 A1* | 11/2017 | Demarinis | G06Q 20/3678 |
| 2018/0006831 A1* | 1/2018 | Toll | G06Q 40/04 |
| 2018/0218003 A1* | 8/2018 | Banga | G06F 17/30097 |

OTHER PUBLICATIONS

Accenture's "Editable Blockchain Prototype Draws Criticism," CryptoCoinsNews, cryptocoinsnews.com, Sep. 28, 2016, pp. 1-3.

Ateniese, Giuseppe et al., "On the Key Exposure Problem in Chameleon Hashes, Security in Communication Networks," (SCN) 2004, Lecture Notes in Computer Science, vol. 3352, Springer, Berlin, Heidelberg, pp. 1-16.

Ateniese, Giuseppe, et al., "Identity-Based Chameleon hash and Applications," FC 2004, LNCS, vol. 3110, Springer-Verlag (2004), pp. 164-180.

Birch, D., "Mutable and Immutable Blockchain," LinkedIn.com, Nov. 2, 2016, pp. 1-14.

(56) References Cited

OTHER PUBLICATIONS

Decker, Christian et al., "*Bitcoin, Transaction Malleability and MtGox, Network and Parallel Computing*," Springer International Publishing, Cham, Switzerland, vol. 8713 (2014), pp. 313-326.
Essentially Optimal Robust Secret Sharing with Maximal Corruptions, Nov. 5, 2015, Cryptology ePrint Archive, pp. 1-38.
Juels, A, et al., "*PORs: Proofs of Retrievability for Large Files*," In ACM Conference on Computer and Communications Security, CCS 2007, pp. 584-597. ACM.
Larimer, D., "*Momentum—A Memory-Hard Proof-of-Work via Finding Birthday Collisions*," Invictus Innovations Inc., Tech. Rep., Oct. 2013.
Moore, C., "*How Accenture Hacked the Blockchain*," LinkedIn.com., Nov. 2, 2016, pp. 1-14.
Rabin, T., "*Verifiable Secret Sharing and Multiparty Protocols with Honest Majority*," (Extended Abstract), STOC '89 Proceedings of the Twenty-First Annual ACM Symposium on Theory of Computing, Association for Computing Machinery (ACM) Digital Library, May 14-17, 1989, pp. 73-85.
Rass, S., "*Dynamic Proofs of Retrievability From Chameleon-Hashes*," in SECRYPT '13. SciTePress, 2013, pp. 296-304.
Zheng, Q, et al., "*Fair and Dynamic Proofs of Retrievability*," In Proceedings of the first ACM Conference on Data and Application Security and Privacy, CODASPY, 2011, New York, NY, USA. ACM, pp. 237-248.
Puddu, Ivan, et al., "µ*chain: How to Forget without Hard Forks*," https://www.airbnb.com and https://gitlab.inf.ethz.ch/puddui/fabric, dated Feb. 10, 2017, (21p).
Zyskind, Guy, et al., "*Enigma: Decentralized Computation Platform with Guaranteed Privacy*," guyz@mit.edu, oznathan@gmail.com, pentland@mit.edu, Jun. 6, 2015, (14p).
International Search Report and Written Opinion for PCT Application No. PCT/EP2017/062240 dated Jul. 10, 2017, (11p).
International Search Report and Written Opinion for PCT Application No. PCT/EP2017/062241 dated Jul. 11, 2017, (11p).
International Search Report and Written Opinion for PCT Application No. PCT/EP2017/062242 dated Jul. 11, 2017, (11p).
International Search Report and Written Opinion for PCT Application No. PCT/EP2017/062243 dated Jul. 10, 2017, (12p).
Non-Final Rejection to U.S. Appl. No. 15/726,023 dated Jan. 9, 2018.
Notice of Allowance to U.S. Appl. No. 15/596,932 dated Mar. 23, 2018.
Notice of Allowance to U.S. Appl. No. 15/684,721 dated May 2, 2018.
Ateniese, G. et al., "A Provably Secure Nyberg-Rueppel Signature Variant with Applications," International Association for Cryptologic Research IACR) ePrint, 2004, pp. 1-17.
Ateniese, G. et al., "Sanitizable Signatures," European Symposium on Research in Computer Security, 2005, LNCS 3679, pp. 159-177, Springer-Verlag Berlin, Heidelberg, 2005.
Final Office Action to U.S. Appl. No. 15/726,023 dated May 21, 2018 (13p).
Notice of Allowance to U.S. Appl. No. 15/725,910 dated Mar. 13, 2018 (5p).
Notice of Allowance to U.S. Appl. No. 15/596,904 dated Mar. 23, 2018 (5p).
Notice of Allowance to U.S. Appl. No. 15/596,932 dated Jul. 26, 2017 (14p).
Notice of Allowance to U.S. Appl. No. 15/596,904 dated Jul. 28, 2017. (11p).
Notice of Allowance to U.S. Appl. No. 15/596,922 dated Aug. 16, 2017 (7p).
Notice of Allowance to U.S. Appl. No. 15/684,721 dated Jun. 19, 2018 (13p).
International Preliminary Report on Patentability for Application No. PCT/EP2017/062240, dated Dec. 6, 2018, pp. 1-10.
International Preliminary Report on Patentability for Application No. PCT/EP2017/062241, dated Dec. 6, 2018, pp. 1-10.
International Preliminary Report on Patentability for Application No. PCT/EP2017/062242, dated Dec. 6, 2018, pp. 1-10.
International Preliminary Report on Patentability for Application No. PCT/EP2017/062243, dated Dec. 6, 2018, pp. 1-10.

\* cited by examiner

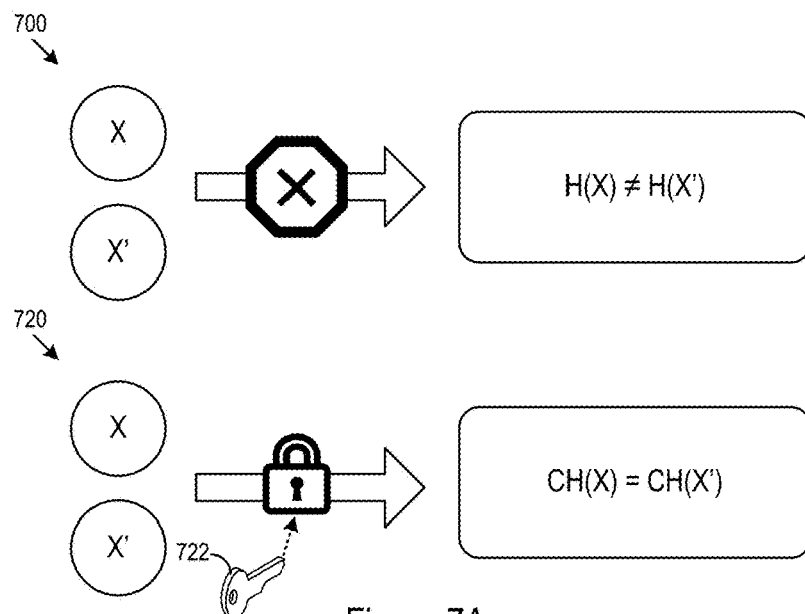
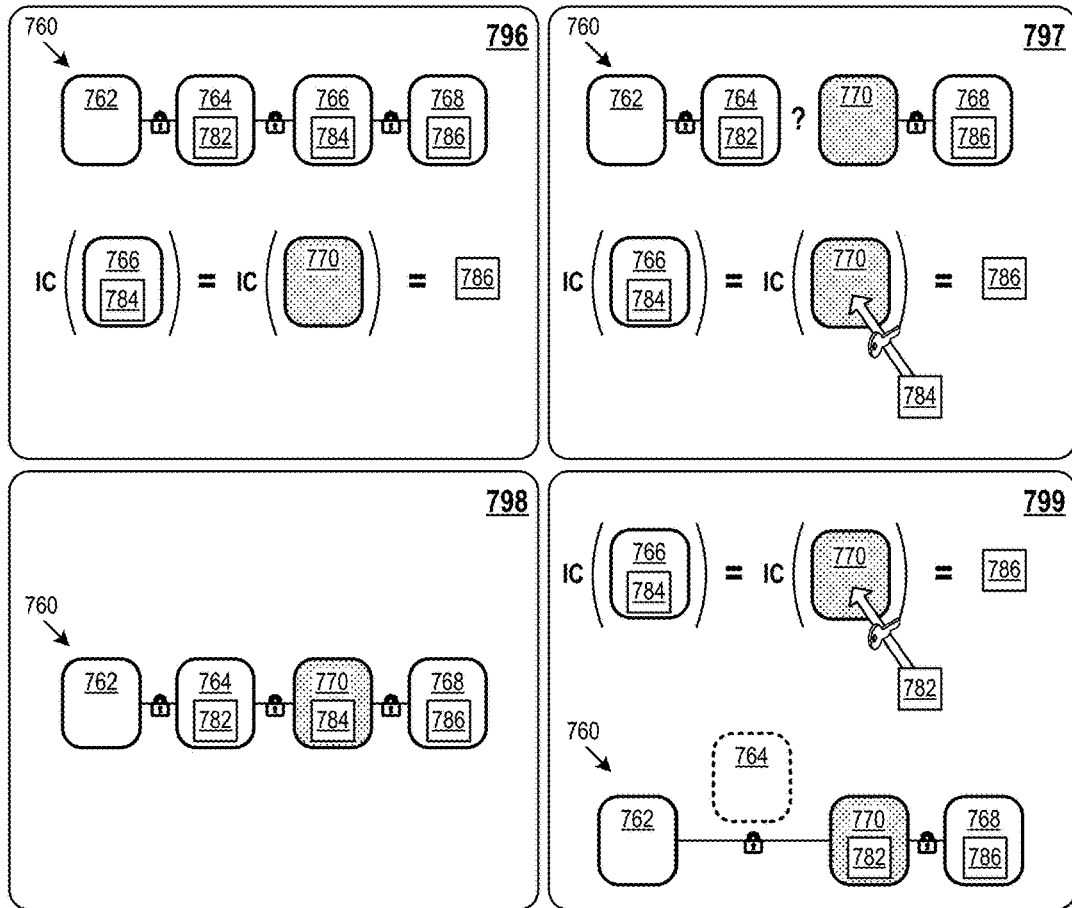
Figure 7A
Figure 7B

REWRITABLE BLOCKCHAIN

PRIORITY CLAIM

This application is a continuation of and claims priority to U.S. patent application Ser. No. 15/596,904, filed on 16 May 2017, titled Rewritable Blockchain, which is incorporated by reference in its entirety. U.S. patent application Ser. No. 15/596,904 claims priority to European Patent Application Serial No. 17425018.3, filed 17 Feb. 2017, and titled Rewritable Blockchain, which is incorporated by reference in its entirety. U.S. patent application Ser. No. 15/596,904 also claims priority to European Patent Application Serial No. 16425086.2, filed 11 Aug. 2016, and titled Rewritable Blockchain. U.S. patent application Ser. No. 15/596,904 also claims priority to European Patent Application Serial No. 16425044.1, filed 23 May 2016, and titled Rewritable Blockchain.

CROSS-REFERENCE TO RELATED APPLICATIONS

This application is related to U.S. patent application Ser. No. 15/596,899, now U.S. Pat. No. 9,774,578, filed on 16 May 2017, titled Distributed Key Secret for Rewritable Blockchain, which is incorporated by reference in its entirety. This application is also related to U.S. patent application Ser. No. 15/596,922, now U.S. Pat. No. 9,785,369, filed on 16 May 2017, titled Multiple-Link Blockchain, which is incorporated by reference in its entirety. This application is also related to U.S. patent application Ser. No. 15/596,932, filed on 16 May 2017, titled Rewritable Blockchain, which is incorporated by reference in its entirety. This application is also related to U.S. patent application Ser. No. 15/684,721, filed on 23 Aug. 2017, titled Distributed Key Secret for Rewritable Blockchain, which is incorporated by reference in its entirety. This application is also related to U.S. patent application Ser. No. 15/725,910, filed on 5 Oct. 2017, now U.S. Pat. No. 9,959,065, titled Hybrid Blockchain, which is incorporated by reference in its entirety. This application is also related to U.S. patent application Ser. No. 15/726,023, filed on 5 Oct. 2017, titled Wrapped-up Blockchain, which is incorporated by reference in its entirety.

TECHNICAL FIELD

This disclosure relates to data verification, validation, and re-writing in complex real-world systems.

BACKGROUND

Rapid advances in electronics and communication technologies, driven by immense customer demand, have resulted in the widespread adoption of electronic transactions and record keeping. As one example, e-currencies, such as Bitcoin, have displaced paper currencies in millions of transactions per year. Improvements in the verification and recordation of such electronic transactions will continue to increase the features and options available to operators engaging in electronic transactions.

BRIEF DESCRIPTION OF THE DRAWINGS

FIG. 7A shows two example collision searches.

FIG. 7B shows an example rewrite to a blockchain using a collision.

DETAILED DESCRIPTION

Figure 1:
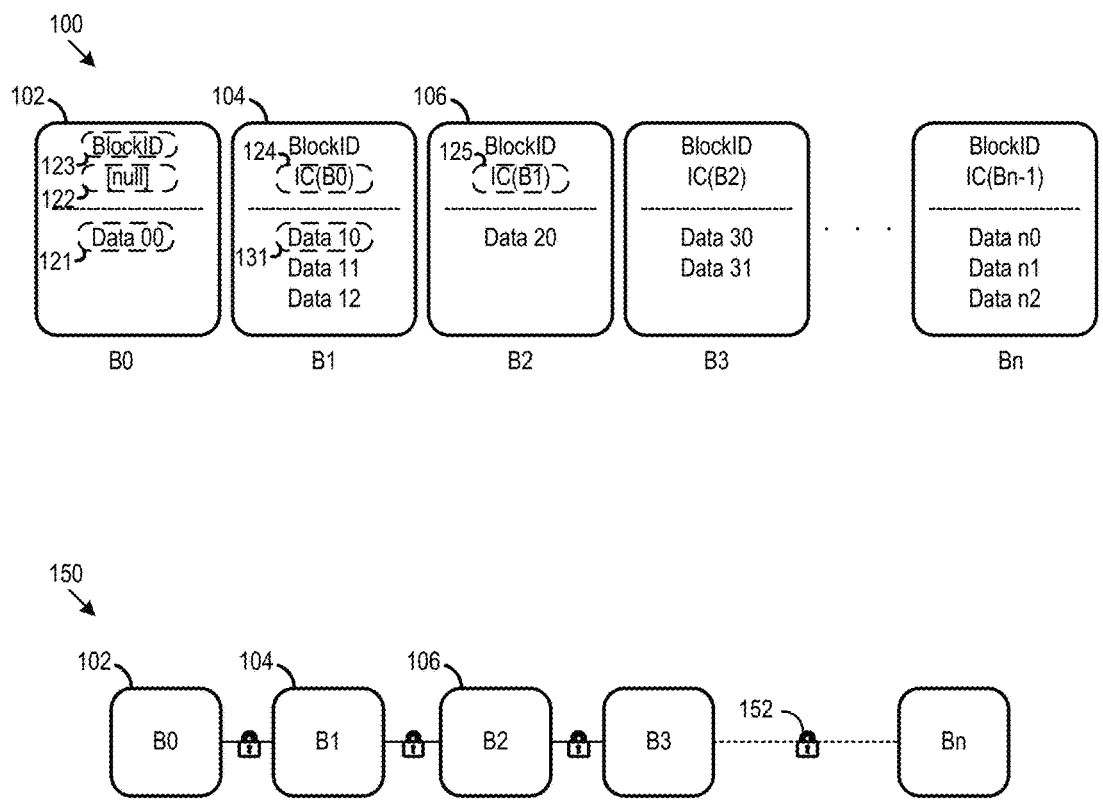
FIG. 1 shows two example views of a blockchain.

A blockchain may include a series of data blocks, the blocks including a code, such as a cryptographic hash or checksum, which may be coding-consistent with the content of previous blocks in the series. In some cases, determining multiple different sets of blocks that produce the same integrity code may be insoluble, prohibitively computationally complex, or otherwise effort intensive enough to frustrate attempts to tamper with the contents of the blockchain while maintaining the self-consistence of the integrity codes. However, in some implementations a trusted party may have access to a key secret, or portion of a key secret, such that the party, acting alone or with those in possession of the other portions of the key secret, may edit the blockchain contents without leaving indication of tampering.

In various systems multiple parties may use a blockchain-based file or ledger to maintain a tamper-evident record of events, transactions, or other updates. In some cases, a blockchain may register tampering after a change made to the blockchain by an untrusted party, for example a party not in possession of the key secret. Thus, the parties may individually verify that updates by other parties are valid and coding-consistent with the previous data blocks of the blockchain. The self-consistence of the integrity codes allows the updates to the blockchain to be verified even if the party lacks an archived version of the blockchain to use as a reference. When a rewrite to one or more data blocks in a blockchain does not introduce coding-inconsistency among the integrity outputs and data block contents of the blocks in the blockchain, the rewrite may be characterized as preserving the validity of the blockchain.

A blockchain may be secured by an integrity code. An integrity code may produce a particular integrity output when particular data is provided as input to the integrity code. In some cases, when data different than the particular data is provided to the integrity code as input, the integrity code may produce a different integrity output. In an example scenario an integrity output from the integrity code generated from particular input data from a data block is stored and the data block is later changed. If the changed data is provided to the integrity code as input, the integrity code may produce an integrity output that is different or otherwise coding-inconsistent with the stored integrity output. Therefore, the change may be detected in this example scenario.

A blockchain may include a series of blocks where each subsequent block in the series holds the integrity output for a previous block. The series may form a chain of blocks in which each subsequent block holds an integrity output generated from the data present in the immediately prior block. Accordingly, if a block is changed, a coding-inconsistency with the integrity output stored in a subsequent block may be detected. Since the integrity outputs are part of the stored data in the blocks, changes to the integrity outputs themselves may also be detected through coding-inconsistencies. This self-consistency of the integrity code may be used to secure a blockchain with respect to covert tampering.

When secured by an integrity code, a tamper-evident change may include virtually any change for which a coding-inconsistency between the integrity outputs of the integrity code for a blockchain and the data within the blockchain can be detected. For example, the data in a block of the blockchain may be hashed, run through a checksum, or have another integrity code applied. If the data in the block is later found to conflict with the integrity output of the hash, checksum, or other integrity code, the change may be identified as tamper-evident. A conflict may occur when the data currently in a block does not produce an identical or equivalent integrity output to the earlier obtained integrity output when the integrity code is applied to the data currently in the block. When a change is made to a block and no coding-inconsistency with the previously stored integrity outputs of the integrity code can be detected afterward, that change may be non-tamper-evident. In some cases, a non-tamper-evident rewrite may be implemented by substituting a first block with a second block with different data content that produces the same (or an equivalent) integrity output.

In some cases, after entry, some blocks in a blockchain may include information that is no longer appropriate for inclusion in the blockchain. For example, blocks may expire after time or after a determined number of subsequent entries, private information may be included in the blocks, inaccurate entries may be included in the blocks, information prejudicial to one or more of the parties using the blockchain may be included in the blocks, incomplete information may be included, or other inappropriate information may be included. Accordingly, a trusted party, for example a neutral third party, a governing party, or a group of individually untrusted parties, may rewrite, remove, or supplement data included in the blocks in a non-tamper-evident fashion. The systems and techniques described below implement technical solutions for rewriting blocks in the blockchain to allow trusted parties to redact information from the blockchain, without causing the blockchain to fail for its intended purpose. For example, the parties may use a modified blockchain as if it was the earlier, and unmodified, blockchain.

Blockchain rewrites may be used to perform low level (e.g., from a hardware architecture standpoint) operations such as memory rewrites, deletions, and additions. Accordingly, the techniques and architectures may improve the operation of the underlying hardware of a computer system because the system may utilize blockchain protocols for storing data for which verifiability is implemented. For example, operating system software for secure systems may be stored in blockchain payloads to protect the data from manipulation by malware, unauthorized parties, unauthorized devices, or other unintended/unauthorized alterations.

Additionally or alternatively, blocks may represent a smallest increment of data that may be distributed when an update is made. For example, one or more updated block may be sent separately from the entire blockchain during an update. However, in some cases, at least the entire blockchain may be distributed with individual valid updates. For example, when a new secured transaction is performed and added to a ledger secured via a blockchain, the entire blockchain (e.g., full transaction history) may be re-distributed with the updated transaction added. Blockchain rewrite systems, such as exemplary implementations described herein, that allow truncation, right-sizing, extension, or other blockchain size adjustments may improve the operation the underlying hardware by allowing adjustment of the data overhead consumed during blockchain update and distribution.

In addition, the ability of a trusted party to rewrite a blockchain may improve tamper-resistance by providing an established rewrite solution. Accordingly, rather than having to jettison a blockchain due to inappropriate content, a trusted party may rewrite the existing blockchain. Accordingly, blockchain rewrite dramatically improves system efficiency, compared to recreating a new blockchain. Blockchain rewrite may also reduce the probability of a malicious party using a defunct blockchain, which may have been discarded due to inappropriate content, to spoof a system by notifying the system that it did not receive a prior notification of the blockchain discard. Accordingly, the rewritable blockchain may have the technical effect of improved data security and tamper-resistance. In other words, the techniques and architectures discussed herein comprise concrete, real-world applications of and improvements to existing technologies in the marketplace.

Further, the techniques and architectures, including those for rewritable blockchains, distributed key secrets, dual-link blockchains, loops, and other techniques and architectures discussed require one to proceed contrary to accepted wisdom. In particular, conventional approaches to blockchain distributed databases require immutability of the blockchain as a foundational feature. Expressed another way, immutability has been repeatedly explained in prior work as an essential feature in establishing the technological value of a blockchain. Immutability in blockchains has been incorrectly viewed and dictated as the required way to ensure that parties using a blockchain trust the validity of the data contained in the blockchain. Accordingly, the techniques architectures described here that add rewritability to a blockchain proceed contrary to accepted wisdom. The present techniques and architectures proceed contrary to accepted wisdom by introducing rewritability, while still maintaining high security, and therefore the high technological value of the blockchain. As such, despite the significant departures of the present techniques and architectures from prior teachings, the present techniques and architectures provide high levels of trust in the blockchain despite its mutability.

FIG. 1 shows example two example views 100, 150 of a blockchain where each subsequent block includes an integrity code (e.g., a hash, chameleon hash, or other integrity code) using the previous block as an input. For instance, block B1 104 includes a integrity output, IC(B0), in this integrity output field 124 determined from content of previous block B0 102 serving as input to the integrity code. The content of B0 102 used in determination of IC(B0) may include any or all of the fields within B0, such as Data 00 121, the [null] integrity output field 122, or the BlockiD 123. The data fields (e.g., Data 00 121, Data 10 131, and other data fields) of the blocks may be used to store any type of data. For example, the blockchain data fields may hold account data, personal data, transaction data, currency values, contract terms, documents, version data, links, pointers, archival data, other data, or any combination thereof.

The fields in a block that are not used to determine the integrity output in a subsequent block may not necessarily be secured by the blockchain. For example, these fields may be altered without generating coding-inconsistencies among the blocks. Further, if any integrity output field is not used in the determination of the integrity output for a subsequent block in the chain, the blockchain may not necessarily ensure the coding-consistency among blocks discussed above because the unsecured integrity output may be changed without necessarily generating evidence of tamper. Accordingly, in various implementations, the integrity output field and at least a secured portion of a data payload of a block are used in determination of the integrity output for a subsequent block (e.g., the next block) in the blockchain. Similarly, IC(B1) in the integrity output field 125 of block B2 106 may be based on fields within Block B1 104, including, for example, any of the integrity output field 124, the data fields, or the BlockiD field of block B1 104. In the example, the integrity code, IC, may be a chameleon hash, as discussed below.

The blockchain blocks may be locked 152 to one another via the integrity codes. In one sense, the blocks are locked to one another because the integrity code output fields in each of the blocks are based on the content in the previous block at the time the integrity output was generated (e.g., when the block was added to the chain). Accordingly, if a previous block changes after a current block is added, the change will be tamper-evident because the change will be coding-inconsistent with the integrity output stored in the current block. Hence, the content of the previous block is "locked-in" once a current block with a stored integrity output based on the previous block is added to the blockchain. In the example blockchain in FIG. 1, the content of B1 104 may be locked once B2 106, which contains IC(B1) in its integrity output field, is added to the blockchain. As a result, the content of B0 102 which was locked by B1 104 is further secured by B2 106 because B2 106 prevents B1 104 from being changed in a non-tamper-evident manner.

In an example scenario, the rewritable blockchain may be implemented using chameleon hash as the integrity code, as discussed below. However, virtually any code may be used for which tampering is self-evident for parties not in possession of a key secret allowing editing.

Figure 2:
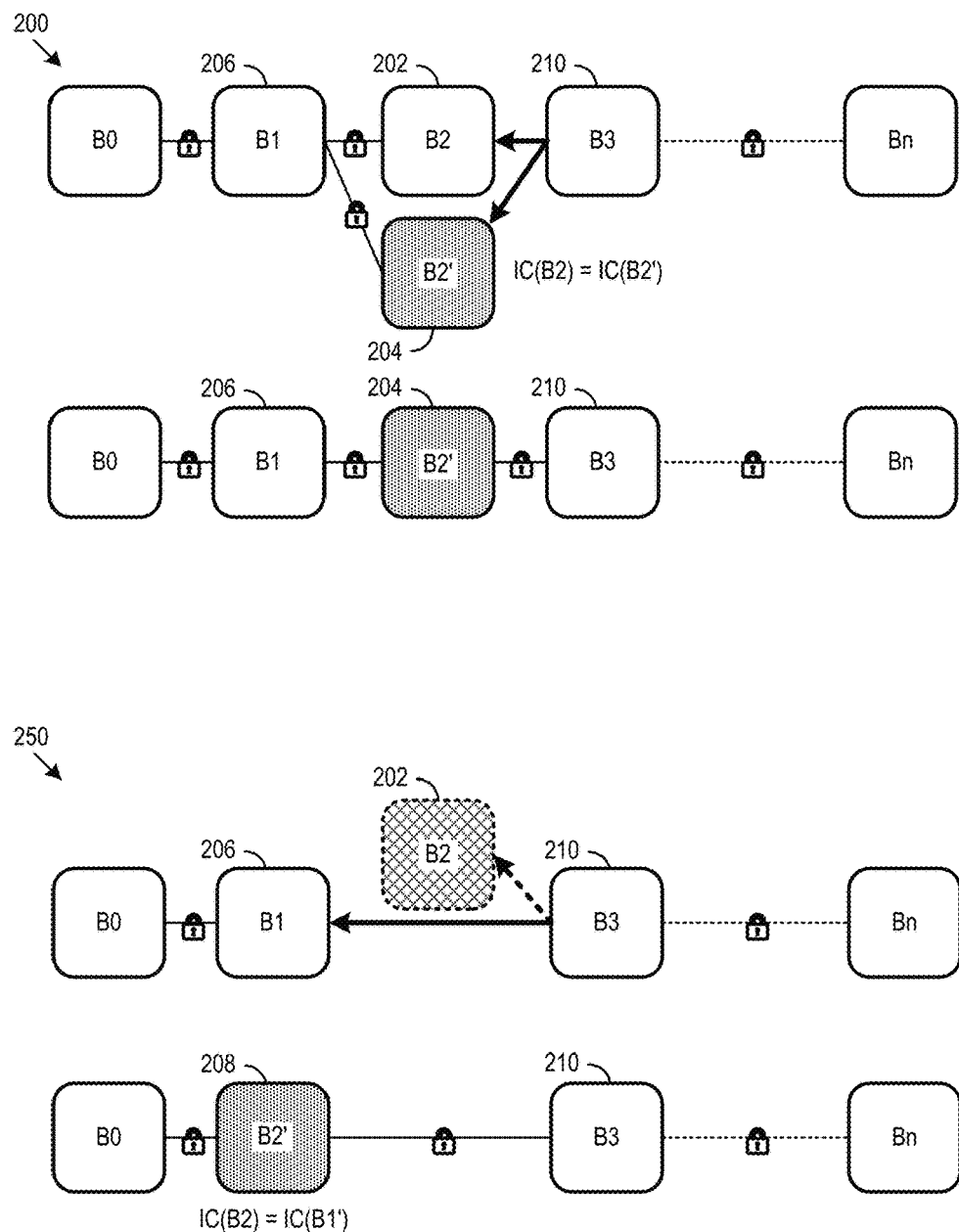
FIG. 2 shows two example rewrites to the example blockchain of FIG. 1.

FIG. 2 shows two example rewrites 200, 250 to the example blockchain of FIG. 1. In the first example 200, the block B2 202 is replaced with a block B2' 204 with new content The new block B2' 204 includes content generated using the key secret such that the integrity output generated when using block B2' 204 as input is the same as that using original block B2 202 as input. For example, IC(B2)=IC(B2').

In the second example 250, the block B2 202 is removed. Block B1 206 from the original chain may be replaced with block B1' 208 to be coding-consistent with the integrity output contained in block B3 210. For example, the block B1' 208 may include content generated using the key secret such that the updated block B1' 208 may appear to be the correct block (and is a correct block in terms of the blockchain integrity code) to precede subsequent block B3 210. That is, B1 is replaced after deletion of block B2 so that B1' can immediately proceed B3 without any violation of the blockchain integrity code.

In various implementations, different rewritable blockchains may have different key secrets. Thus, a trusted party able to rewrite a given blockchain may not necessarily be able to act as a trusted party and rewrite a second, different, blockchain. Using different key secrets for different blockchains may prevent multiple blockchains from being compromised simultaneously through the disclosure of a single key secret. However, multiple blockchains using the same "master" key secret may be generated by blockchain systems (e.g., a key secret may be a master key secret if it may be used with multiple different blockchain systems). Using a common secret among multiple blockchains may allow for more streamlined administration than using different key secrets for the different blockchains.

Additionally or alternatively, a blockchain may have multiple different key secrets that allow non-tamper-evident editing. In an example scenario, a master key secret may be used with multiple blockchains each with individual key secrets that do not necessarily allow non-tamper-evident editing on the other blockchains covered by the master key secret. For instance, blockchains A, B, and C may all allow rewrite with master key secret MK. Further, blockchain A may have an individual rewrite key secret A1, blockchain B may have an individual rewrite key secret B1, and blockchain C may have an individual rewrite key secret C1. In this example, a processing system may rewrite blockchain B using MK or B1, but not with A1 or C1.

Further, in some implementations, a granting key secret may be used to issue key secrets to trusted parties. For example, encrypted cache EC may include additional key secrets for blockchains A, B, and C (e.g., key secrets A2 . . . AN, Bn . . . Bn, C2 . . . Cn). A trusted party in possession of a granting key secret GK to decrypt EC and allow issuance of the stored keys to new trusted parties. In some cases, a master key secret may double as a granting key secret. For example, processing systems may use master key secret to generate block content for rewriting, and the master key secret may serve as a decryption key for an encrypted cache of key secrets.

In addition, distributed key schemes discussed below, may be applied for granting key secrets and master key secrets. In some systems, trusted parties may individually perform rewrites to the blockchain. However, the same trusted parties may combine, using any of the distributed key schemes discussed below, their keys to gain the authority associated with a granting key or master key. For example, three individually trusted parties may each perform rewrites without the assent of the other parties. However, the three parties may be forced to combine their key secrets, e.g., coordinate, to gain granting privileges and grant a fourth party its own key secret.

In various implementations, increased privileges may be obtained through coordination of a specified threshold number of parties, by specific pre-determined parties, by parties of a given class, by all parties, or by another defined group of parties. The distributed key secret scheme may determine the participation level rules for coordination.

In various implementations, keys secrets may be assigned to operators using key secret assignment schemes. The key secret assignment schemes may include assignment schemes based on operator identity, association, priority, or other basis.

In some cases, the blockchain is flagged to indicate that it is subject to editing. The flags or fields indicating that the blockchain is rewritable may identify the trusted parties with authority to rewrite the blockchain. This may assist parties with an interest in rewriting the blockchain in identifying the trusted parties able to perform the rewriting. For example, a blockchain may be accompanied by metadata describing the purpose, original, operational parameter, or other information on the blockchain. Flags for rewriting may be incorporated within the metadata. However, when such metadata is included outside of the blockchain it may be changed without evidence of tampering. Allowing the metadata to be changed freely may reduce computing resources needed to perform an edit and increase the number of parties that may correct a metadata error. In other systems, processing systems may write such metadata into the blocks of the blockchain itself, for example, into dedicated fields or the data payload of blocks. Writing the metadata to the blockchain itself may prevent unauthorized parties from altering blockchain metadata (e.g., for potentially malicious purposes).

In some implementations, the existence of the trusted parties may be kept secret from the untrusted parties or a portion of the trusted parties. In some cases, the integrity code may not necessarily provide an indication by inspection of its operation that trusted parties may edit entries in the blockchain. That is, the algorithm that generates the integrity code does not itself easily reveal that it supports blockchain rewrite. Keeping the existence of the trusted parties in confidence may discourage parties from attempting to steal or otherwise acquire the trusted party's key secret. Further, parties may have increased confidence in the blockchain if the parties assume that the blockchain cannot be edited by another party without the tampering being evident.

In some implementations, entities with knowledge of a key secret may make alterations to the blockchain. This key secret could be in the possession, in whole or in part, of operators, a centralized auditor, or other parties. Additionally or alternatively, shares (e.g., portions) of the key could be distributed among several individually untrusted parties. The integrity code may be a virtual padlock on the link connecting two blocks.

The key secret to open the virtual padlock can be managed according to the requirements of specific applications. For example, in a business negotiation (or government treaty negotiations) a key secret allowing alteration of proposed contract (treaty) terms may be held by neutral third party. Additionally or alternatively, equal portions (e.g., halves, thirds) of the key secret may be held by each party in the negotiation, such that terms may be altered with the consent of all parties or a defined plurality of the parties. In collaborative software design implementations, key secrets may be distributed in portions to stakeholders to enforce consensus before allowing alteration to certain software code. Below, example key secret distribution schemes are discussed, including centralized and distributed schemes. However, other schemes are possible.

Figure 3:
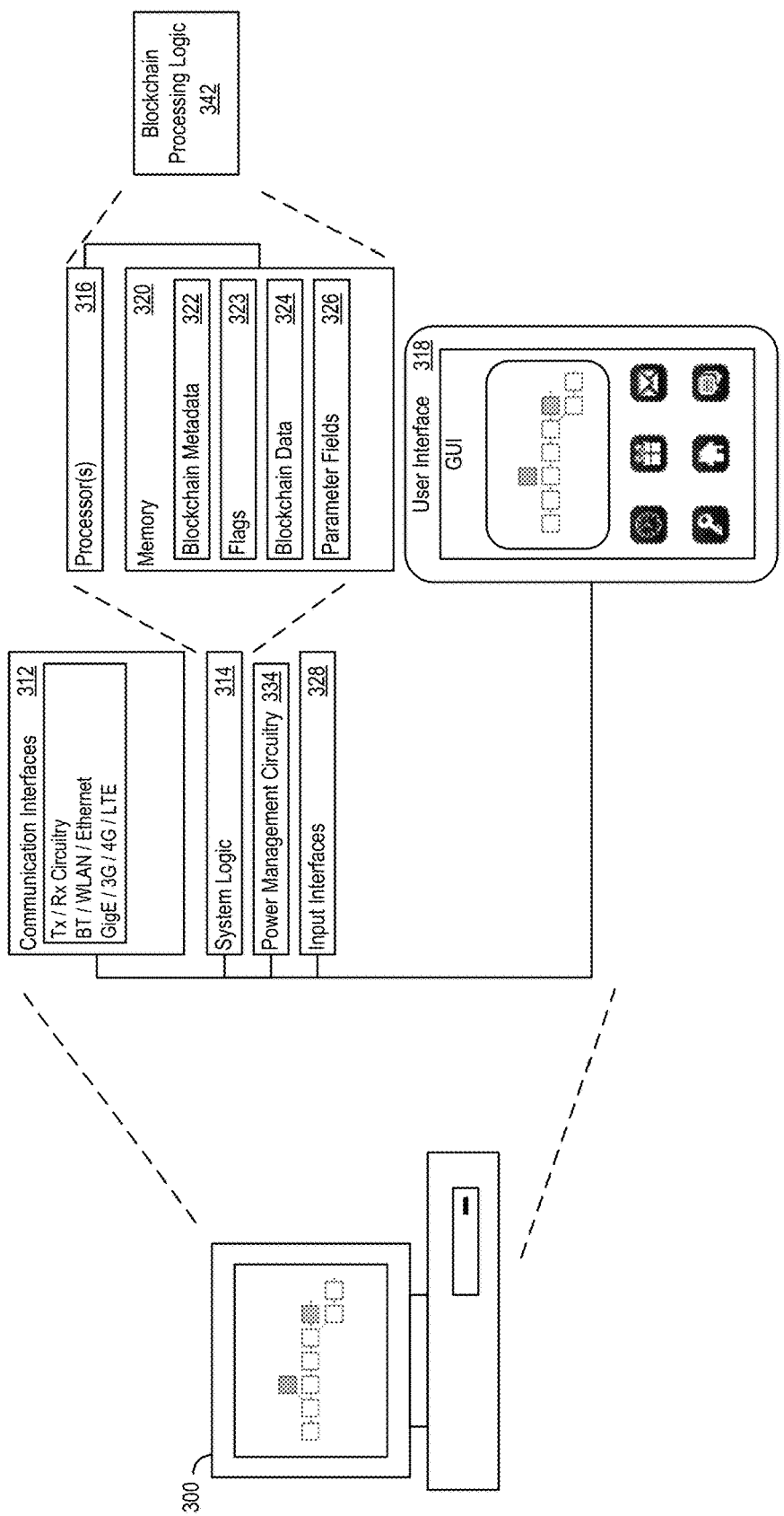
FIG. 3 shows an example blockchain processing system.

FIG. 3 shows an example blockchain processing system (BPS) 300. The BPS 300 may include system logic 314 to support verifications of and rewrites to blockchains. The system logic 314 may include processors 316, memory 320, and/or other circuitry, which may be used to implement the blockchain processing logic 342. The memory 320 may be used to store blockchain metadata 322 and/or blockchain data 324 used in blockchain rewrites and block additions.

The memory may further include program instructions that implement blockchain processing, and one or more supporting data structures, for example, coded objects, templates, or other data structures to support verification of updates to blockchains and detect evidence of tampering. The memory may further include flags 323 which may indicate whether particular blockchains can be edited. In an example, the flags 323, may be implemented using a bit within specific fields within a blockchain or blockchain metadata to indicate editability. Further, the memory 320 may include parameter fields 326 that may include the identities of contact information of the trusted parties, for example, names, addresses, phone, email, or other contact information.

The BPS 300 may also include one or more communication interfaces 312, which may support wireless, e.g. Bluetooth, Wi-Fi, wireless local area network (WLAN), cellular (third generation (3G), fourth generation (4G), Long Term Evolution Advanced (LTE/A)), and/or wired, ethernet, Gigabit ethernet, optical networking protocols. The communication interface 312 may support communication with other parties making updates to blockchains or performing blockchain transfers. The BPS 300 may include power management circuitry 334 and one or more input interfaces 328. The BPS 300 may also include a user interface 318 that may include man-machine interfaces and/or graphical user interfaces (GUI). The GUI may be used to present data from blockchain-based verifications to an operator of the BPS 300. The user interface 318 may also render GUIs with tools to support block additions to blockchains.

Figure 4:
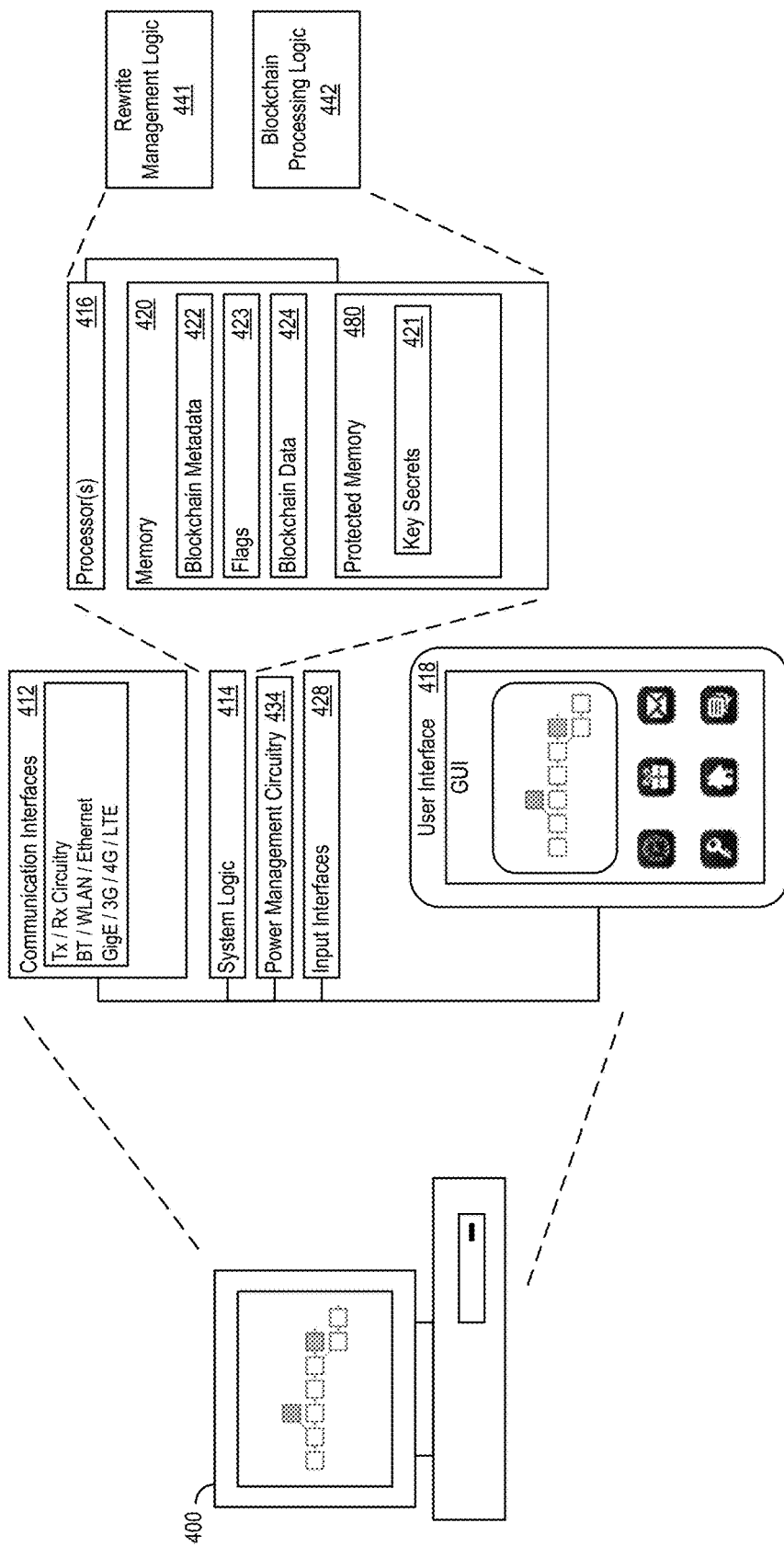
FIG. 4 shows an example blockchain rewriting system.

FIG. 4 shows an example blockchain rewriting system (BRS) 400. The BRS 400 may be used by, for example, a trusted party performing redaction, revision, or supplementation on a blockchain. For example, a supplementation may include adding content to an existing block. Even in blockchains that do not support non-tamper-evident rewrites, an authorized operator may add a new block, e.g., a new transaction record, to the blockchain. However, alterations to existing blocks (including additions) may generate evidence of tamper unless performed by a trusted party in possession of a key secret. The BRS 400 may include system logic 414 to support verifications, updates, and rewrites to blockchains. The system logic 414 may include processors 416, memory 420, and/or other circuitry, which may be used to implement the blockchain processing logic 442 and the rewrite management logic (RML) 441.

The memory 420 may be used to store blockchain metadata 422 and/or blockchain data 424 used in blockchain rewrites and block additions. The memory 420 may further store key secrets 421, such as an encryption key value, trapdoor information, or other secret value, that may allow non-tamper-evident rewriting of a blockchain. In some cases, the key secrets 421 may be stored in protected memory 480, such as encrypted files or data drives, physically secured drives, drives coupled to triggers for anti-theft countermeasures, or self-deleting drives to prevent accidental or surreptitious disclosure of the stored key secrets 421. The memory storing key secrets may include trusted memory or other memory in possession of or controlled, either directly or indirectly, by a trusted party.

The memory 420 may further include applications and structures, for example, coded objects, templates, or one or more other data structures to support verification of updates to blockchains and detect evidence of tampering. The memory may further include flags 423 which may indicate whether particular blockchains can be edited and the identities of the trusted parties. The BRS 400 may also include one or more communication interfaces 412, which may support wireless, e.g. Bluetooth, Wi-Fi, WLAN, cellular (3G, 4G, LTE/A), and/or wired, ethernet, Gigabit ethernet, optical networking protocols. The communication interface 412 may support communication with other parties making updates to blockchains or performing blockchain transfers. Additionally or alternatively, the communication interface 412 may support secure information exchanges, such as secure socket layer (SSL) or public-key encryption-based protocols for sending and receiving key secrets between trusted parties. Further, the secure protocols may be used to combine key secrets among individually untrusted parties each having some portion of a key secret, as discussed below. The BRS 400 may include power management circuitry 434 and one or more input interfaces 428.

The BRS 400 may also include a user interface 418 that may include man-machine interfaces and/or graphical user interfaces (GUI). The GUI may be used to present data from blockchain-based verifications to an operator of the BRS 400. Additionally or alternatively, the user interface 418 may be used to present blockchain rewriting tools to the operator.

In some cases, the user interface 418 may include a GUI with tools to facilitate blockchain rewrites and deletions. The GUI tools for rewriting may include "what you see is what you get" tools that allow operators to manipulate the content of the blockchain, e.g., using word-processor-like tools, web-editing-like tools, file-browsing-like tools, or any combination thereof. Additionally or alternatively, the user interface 418 may include command-line editing tools. The tools, whether text or graphic based, may allow operators to access key secrets and perform edits on blockchains for which they are authorized. In some cases, the tools may deny writing capabilities to operators lacking the proper key secret for the blockchain that they are attempting to edit. However, in some implementations, the tools may allow such unauthorized editing because it will result in tamper-evident rewrite that will invalidate the unauthorized edits to the blockchain.

Figure 5:
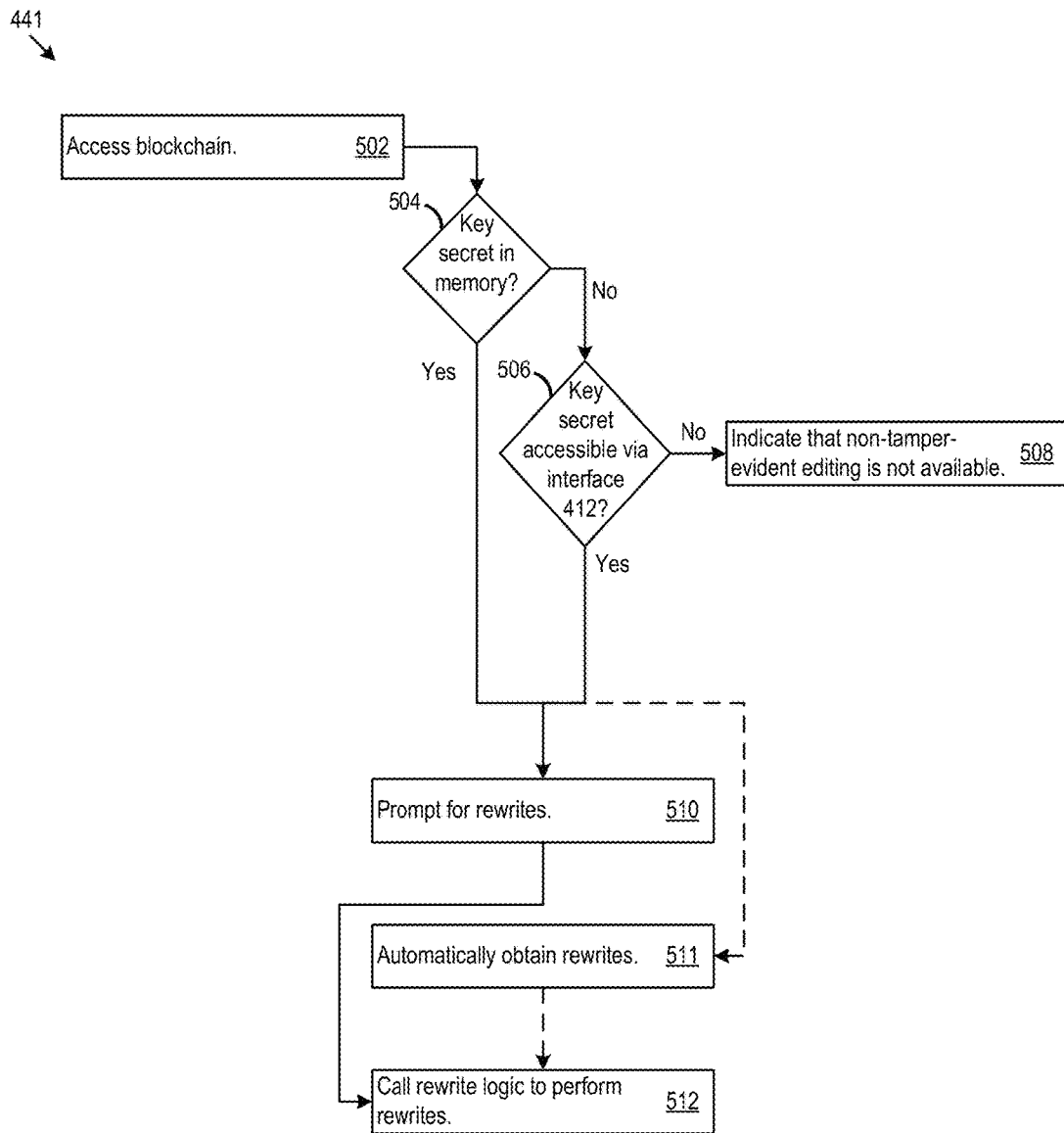
FIG. 5 shows example rewrite management logic.

FIG. 5 shows example RML 441, which may be implemented in or with circuitry. The RML 441 may handle management of key secrets and implementation of rewrite commands. For example, the RML 441 may determine availability of key secrets for particular blockchains and pass those key secrets to the rewrite logic 600 (discussed below) for execution of the rewrites. The RML 441 may also handle reception of rewrite commands or reception of commands for the automation of blockchain rewrites. Once, the RML 441 identifies the change requested and the blockchain involved, the RML 441 may access the blockchain (502).

The RML 441 may determine whether the memory 420 of the BRS 400 holds a key secret allowing rewrites to the accessed blockchain (504). If the memory 420 does not store the key secret, the RML 441 may determine whether the key secret is accessible via secure communication or via secure combination of portions of the key secret using the communication interface 412 (506). For example, the portions may include portions of a key secret held by parties that individually are untrusted, but as a group, with their portions combined into a full key secret, form a trusted party. In some implementations, the key secret or portion thereof may be accessed via a secure communication using communication interface 412, e.g., to protect against interception of the key secret during communication. If the key secret cannot be accessed, the RML 441 may indicate, via the GUI 418 that non-tamper-evident rewrites to the blockchain are not available (508). If the key secret is accessible, either in memory or via secure communication, the RML 441 may prompt the operator for rewrites to the blockchain (510).

Figure 6:
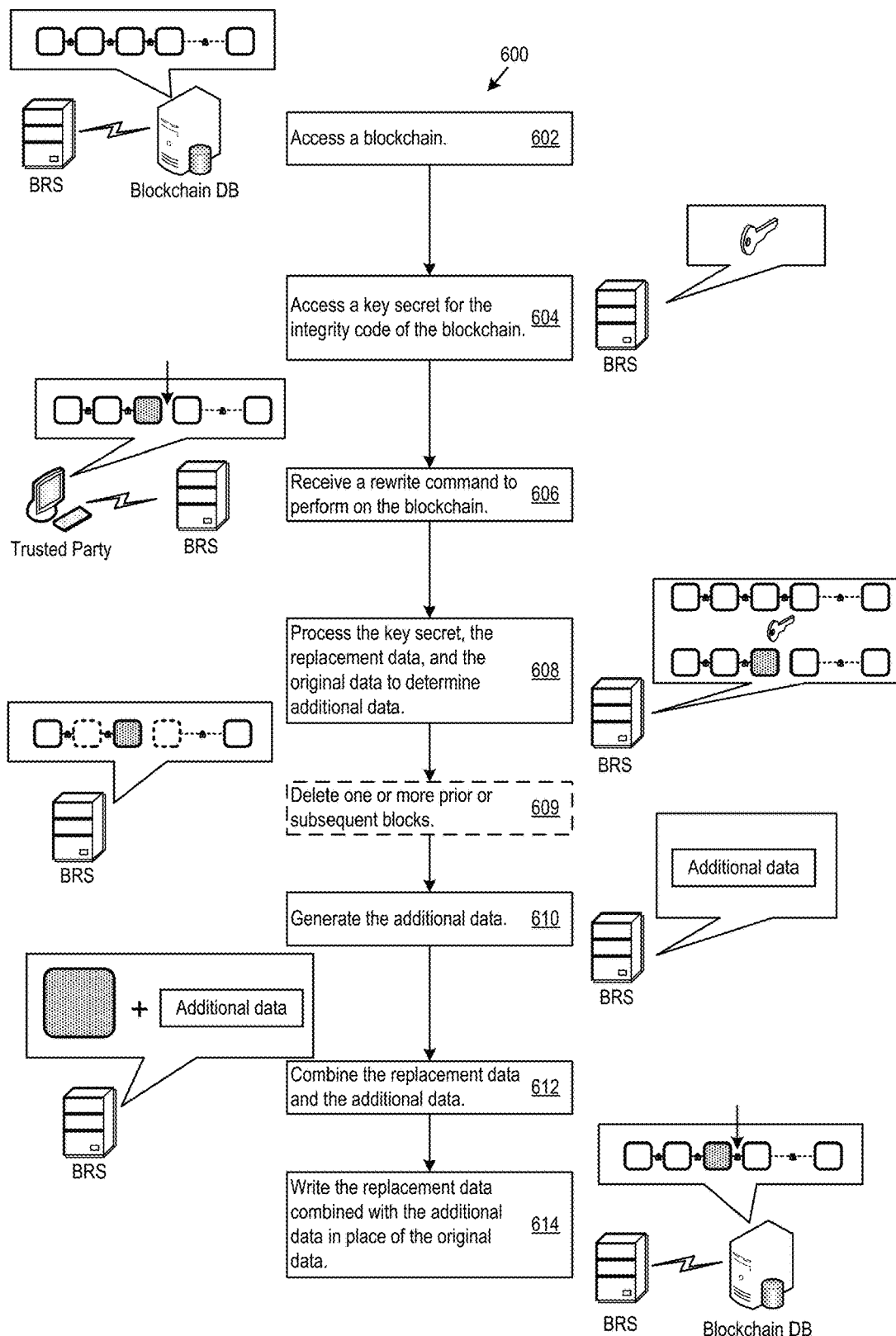
FIG. 6 shows example rewrite logic.

Additionally or alternatively, the RML 441 may automatically obtain rewrites (511). For example, rewrites may be available from a rewrite queue, embedded within a previously received command, obtained from other blockchains, determined from content identified by the systems as malicious code or other inappropriate content, or other rewrites automatically obtained by the RML 441. The rewrites may be stored as a command identifying changes to be made to one or more blocks and, if content is to be added by the change, content to be written to the blocks. The command itself may include the content to be written or, alternatively, may include a pointer to location of the content. The RML 441 may call rewrite logic 600 (see FIG. 6) to perform the rewrites (512). For example, when non-tamper-evident rewrites are available, the BRL 441 may call rewrite logic 600 to execute the rewrites to the block. FIG. 6 shows example rewrite logic 600, which may be implemented in or with circuitry. The rewrite logic 600 may access a blockchain (602). For example, the rewrite logic 600 may access memory where a blockchain is stored. Additionally or alternatively, the rewrite logic 600 may access a blockchain via a networking communication interface (e.g., communication interfaces 412). In some cases, the rewrite logic 600 may access the blockchain using a secured connection or on secured memory as discussed above.

The blockchain may include one or more data blocks that are secured by an integrity code. For example, a rewrite-protected cryptographic hash function, such as a hash function without a key secret for allowing non-tamper-evident rewrites, a chameleon hash, cyclic redundancy checks (CRCs), checksums, or other integrity codes may be used to secure the data blocks within the blockchain. In some implementations, the individual data blocks may be secured by a particular integrity output that is coding-consistent with the data content of the block. For example, an integrity output may be coding-consistent with the content of block when applying the integrity code to the contents of the block that produces that integrity output. When an integrity output is coding-consistent with the data that it secures, the data may be deemed valid. As discussed above, that particular integrity output may be placed within a neighboring block to prevent or frustrate attempts to rewrite the data content in a non-tamper-evident fashion. Further, as discussed below with respect to hybrid blockchains, some blockchains may include portions (e.g., of individual blocks or groups of blocks) that may allow for non-tamper-evident rewrites alongside portions that may not necessarily allow for non-tamper-evident rewrites by trusted parties.

The rewrite logic 600 may access a key secret, such as a cryptographic key or trapdoor information, that is paired to the integrity code of the blockchain (604). The key secret may include data that allows a system, e.g., the BRS 400, to compute collisions, e.g., two different data blocks that produce the same integrity output for the integrity code. Using the computed collisions, a device may rewrite the blockchain without the rewritten blocks being coding-inconsistent with the integrity code. For example, an operator may instruct a BRS 400 compute a collision using a key secret and rewrite a blockchain.

The rewrite logic 600 may receive a command, e.g., from the RML 441, to perform a rewrite on the blockchain (606). For example, the command may have been received from an operator for a trusted party that wishes to replace or delete data (e.g., content) from a particular block. The operator may indicate, e.g., in a command issued through a man-machine interface to the BRS 400, the original data and the replacement data from input devices of a user interface. Additionally or alternatively, commands to replace data may be received via a network communication interface, for example from a terminal associated with the trusted party. The rewrite logic 600 may receive the command to perform the rewrite from the RML 441. Further commands to perform rewrites may originate from automated sources such as those describe above with respect to the RML 441.

The rewrite logic 600 may process the key secret, the replacement data, and the original data to determine additional data for which the replacement data and the additional data produce the same integrity output for the integrity code that is produced for the original data (608). Accordingly, the replacement data and additional data may supplant the original data without necessarily creating evidence of tampering. In an example scenario, where the integrity code is a chameleon hash, the key secret for the chameleon hash allows the rewrite logic 600 to determine collisions for virtually any original data content. In this example scenario, using the key secret, the rewrite logic 600 may compute additional data that produces the same hash output as any given original data when combined with replacement data selected by a trusted entity.

A deletion operation may be executed in the same or similar fashion as other rewrites. However, rather than selecting a replacement data and additional data to be coding-consistent with neighboring blocks (e.g., blocks immediately subsequent or immediately prior in the blockchain). The replacement data and additional data may be selected to be coding-consistent with other blocks further up or down the blockchain. For example, if the replacement data of the rewritten block collides with the data of a subsequent block further down the blockchain (e.g., non-adjacent blocks) rather than that of the block that is being replaced, one or more subsequent blocks (e.g., one or more consecutive blocks in the blockchain immediately following the rewritten block) may be removed. Additionally or alternatively, if the integrity output field in the replacement data includes an integrity output of a block that is two or more blocks prior to the block being replaced, one or more blocks prior to the block being replaced may be deleted. Accordingly, when a rewrite includes a deletion, the rewrite logic 600 may delete one or more blocks prior to or subsequent to the block being rewritten (609).

Once the rewrite logic 600 determines the proper additional data, the rewrite logic 600 may generate the additional data (610) and combine the additional data with the replacement data (612). In some implementations, particularly in schemes where the rewritability of the blockchain is kept confidential, the existence of the additional data may be masked. Thus, a party not in possession of the key secret would not be able to immediately identify the rewritable blockchain as rewritable simply by noting the existence of the additional data.

For example, the additional data may be placed in a field within the blocks that contains data with another identified purpose. For example, the additional data may be appended to integrity output fields or to "randomness" fields as discussed below with regard to FIG. 8.

However, in some cases, declining to expressly identify a specific purpose for the additional data, which would be otherwise incomprehensible, may be sufficient to prevent untrusted operators from developing a suspicion that the blockchain that they are using is a rewritable blockchain.

In various implementations, the chameleon hash may be identifiable by both trusted and untrusted parties to facilitate verification of block content.

The rewrite logic 600 may then write replacement data combined with the additional data in place of the original data (614). For example, the rewrite logic 600 may overwrite the original data with the combined replacement and additional data. Because the combined data is coding-consistent with the integrity output of the original data, the overwrite of the original data may be performed in a non-tamper-evident manner, at least with regard to the integrity code. In other words, the rewrite may be non-tamper-evident, even if replacing the original data with the replacement data alone would result in a tamper-evident rewrite. As discussed below, dual-chain and multiple chain blockchains may be used in some implementations. Accordingly, rewriting a blockchain coding-consistently with a first integrity code of the blockchain may not necessarily result in a fully non-tamper-evident rewrite.

The replacement data may include completely rewritten data; an altered version of the original data, such as a redacted version of the original data; the original data with additions; a complete deletion of the original data; or other data.

The techniques and architectures discussed herein allow rewrites to the content of a blockchain that may be implemented in services, such as decentralized services, that exploit blockchain-based technologies. Non-tamper-evident, validity preserving, or other type of rewrites to a blockchain may be used in various scenarios. The scenarios, for example, may include removing improper content from a blockchain, providing support for applications that use rewritable storage, complying with governmental regulations such as to "the right to be forgotten", or other scenarios.

The techniques and architectures, including those for rewritable blockchains, distributed key secrets, dual-link blockchains, loops, and other techniques and architectures discussed herein may be used in conjunction with various blockchain consensus techniques. For example, in some cases, rewritable blockchains may be used with proof of work based consensus mechanisms. Accordingly, operators, e.g., untrusted operators, may be granted the ability to append a block to the rewritable blockchain upon finding a solution of a pre-defined challenge and showing proof of work for the solution. In some implementations, consensus mechanisms based on "practical Byzantine fault tolerance" may be implemented. Further, some implementations may use "smart contract" type consensus mechanisms where operators may append blocks upon a showing of compliance with the terms or rules of the smart contract. Integrity codes may be implemented independently of the particular consensus mechanism used in a blockchain. Accordingly, integrity code, include integrity code supporting blockchain rewrites, may be implemented with virtually any blockchain consensus mechanism.

In some implementations, chameleon hash functions, which may allow for efficient determination of hash collisions when given a key secret, may be used by the system e.g., BRS 400. In some cases, the system may use a chameleon hash to grant a trusted entity, multiple individually untrusted parties that together makeup a trusted party, or other entity the ability to make non-tamper-evident rewrites to a blockchain.

In some implementations, a hash function may remain collision resistant even after polynomially many collisions have been already found (using the key secret). This property may be called key-exposure freeness. As discussed below, a transformation may be used to convert a chameleon hash function into one additionally satisfying key-exposure freeness.

FIG. 7A shows two example collision searches 700, 720. For a hash function lacking a key secret (H), collisions may be difficult to find. Accordingly, finding X and X' such that H(X)=H(x') may be prohibitively difficult (700). However, for a chameleon hash CH, an device in possession of the key secret 722 may be able to find X and X' such that CH(X)=CH(X') (750).

FIG. 7B shows an example rewrite to a blockchain 760 using a collision. Blockchain 760 includes blocks 762, 764, 766, and 768. Block 766 includes integrity output 784.

When two different blocks 766, 770 with different content produce the same integrity output 786 for an integrity code, the blocks 766, 770 are a collision for the integrity code (796). Block 766 may be replaced with block 770 and maintain coding-consistence with subsequent block 768 because blocks 766 and 770 produce the same integrity output. However, if block 770 does not contain the proper integrity output (e.g., integrity output 784), block 770 will not be coding-consistent with block 764. With access to the key secret of an integrity code, a party is able to specify the integrity output present in block 770 (797). Accordingly, block 770 can be made coding-consistent with block 764 by including integrity output 784 (798). Block 770 is still coding-consistent with block 768 because Block 770 collides with block 766. Alternatively, if Block 770 is instead constructed to include integrity output 782, the insertion of Block 770 may be used to delete block 764 (799). With integrity output 782, block 770 is coding-consistent with block 762 (as its preceding block) and block 768 (as the block immediately subsequent). Accordingly, block 764 may be removed from the blockchain with no evidence of tamper.

In some real-world applications, an append-only ledger for the majority of parties (to preserve security) that allows rewriting may be implemented. To implement the real-world application, rewriting may be constrained such that it may be performed by trusted parties or in defined circumstances. Two examples of real-world applications are discussed below with regard to FIGS. 13 and 14.

In some cases, applications such as smart contracts or overlay applications may not necessarily work and scale if the blockchain may not be edited in a validly-preserving or non-tamper-evident fashion. A smart contract may include a sequence of instructions, for example computational instructions, that a party performs in exchange for compensation.

Further, rewritable blockchains may provide support for updates to the application that the blockchain is used to secure. If a blockchain-based system is overhauled after inception, a rewritable blockchain may be used to rebuild the blockchain to reflect to overhaul.

Notation

For a string x, its length may be denoted by |x|; if X is a set, |X| may represent the number of elements in X. When x is chosen randomly in X, the selection may be denoted as $x \leftarrow \$ \ X$. When A is an algorithm, $y \leftarrow \$ \ A(x)$ may denote a run of A on input x and output y; if A is randomized, then y is a random variable and $A(x; r)$ may denote a run of A on input x and randomness r. An algorithm A is a probabilistic polynomial-time (PPT) if A is randomized and for any input x, $r \in \{0, 1\}^*$. The computation of $A(x; r)$ may terminate in after up to poly (|x|) steps.

A security parameter may be denoted as $\kappa \in \mathbb{N}$. A function $v: \mathbb{N} \rightarrow [0, 1]$ may be negligible within the security parameter (or simply negligible) if it vanishes faster than the inverse of any polynomial in $\kappa$, i.e. $v(\kappa) = \kappa^{-\omega(1)}$. For a random variable X, $\mathbb{P}[X=x]$ may denote the probability that X takes on a particular value $x \in X$ (where X is the set where X is defined). Given two ensembles $X = \{X_\kappa\}_{\kappa \in N}$ and $Y = \{Y_\kappa\}_{\kappa \in N}$, $X \equiv Y$ may denote that the two ensembles are identically distributed, and $X \approx_c Y$ may denote that the two ensembles are computationally indistinguishable, for example, for a given scenario.

Public-Key Encryption

A Public-Key Encryption (PKE) scheme is a technique by which information may be exchanged publicly between two or more parties without necessarily disclosing encryption keys, key secrets, or other secrets publicly. Further, PKE may be achieved without necessarily requiring full disclosure of key secrets or other secrets among the parties in the exchange. In an implementation, a PKE may be executed using a tuple of algorithms PKE=(KGen, Enc, Dec) defined as follows: (1) The probabilistic algorithm KGen takes as an input the security parameter $\kappa \in \mathbb{N}$, and outputs a public/secret key pair (pk, sk). (2) The probabilistic algorithm Enc takes as an input the public key pk, a message $m \in M$, and implicit randomness $\rho \in R_{pke}$, and outputs a ciphertext c=Enc (pk, m; $\rho$). The set of all ciphertexts is denoted by C. (3) The deterministic algorithm Dec takes as an input the secret key sk and a ciphertext $C \in C$ and outputs m=Dec(sk, c) which is either equal to some message $m \in M$ or to an error symbol $\perp$.

In some cases, PKE or other secure exchange schemes may be used by individually-untrusted parties to combine portions or shares of a key secret of the integrity code to generate a full key secret capable of non-tamper-evident rewrites of a blockchain. In some cases secure exchange schemes may be used to ensure that third parties are unable to acquire the portions of the key secret by observing the exchange. Additionally or alternatively, secure exchange schemes may be used by individually untrusted parties to prevent other individually untrusted parties from acquiring multiple portions during an exchange. For example, in an unsecured exchange, once an individually untrusted party collects the portions from the other untrusted parties, the collecting party irrevocably becomes a trusted party. However, in a secure exchange, such as how PKE is implemented, an untrusted party may collect portions of the key secret from the other untrusted parties without actually learning the content of the collected individual portions. Accordingly, collecting portions of the key secret from other individually untrusted parties does not necessarily result in the collecting party becoming a trusted party. Thus, the individually untrusted parties may together makeup a trusted party, but after expiration or other invalidation of a combined key, the individually untrusted parties return to their separate untrusted status until they again agree to combine their individual portions. In some cases, a combined key may expire after a pre-determined period of time or after performing a pre-determined volume of rewrites. For example, the combination process may specify a pre-determined expiration parameter which may delineate a number of rewrites, a number of blocks that may be rewritten, a duration, a volume of data that may be altered, a specific listing of blocks that may be rewritten, one or more event occurrences, or a combination thereof.

In other cases, the key may be combined in such a way that the parties working together can determine the additional content used to perform a non-tamper-evident rewrite of the block. However, no single party necessarily collects a complete (but encrypted) key such that no single party could determine the additional content on behalf of the other parties. Rather, each individually untrusted party within a group that makes up a trusted party may calculate a portion of the additional content (or perform some portion of the processing). An end result from the combined efforts of the individually untrusted parties serves as the additional content to support the non-tamper-evident rewrite of a single block. For any subsequent rewrites, the individually untrusted parties may cooperate again for each specific block that is designated for rewriting by the group that makes up the trusted party.

The individually untrusted parties may be different operators (e.g., entities, institutions, devices, or other parties) with different operator profiles on a single system. Additionally or alternatively, individually untrusted parties may be distributed over multiple systems. The individually untrusted parties may store their respective portions of the key secret in different memory locations, which may have the same or different security features. The individual memory locations may be associated with individual ones of the individually untrusted parties. For example, the memory locations may correspond to a storage device owned or maintained by the respective ones of the individually untrusted parties. Similarly, trusted parties may maintain associated memory locations. In some cases, the memory location may serve as an identifier (whole or in part) of a party. For example, memory location for a trusted party may be used to confirm that the key secret is being controlled (e.g., access control, read/write control, or other control) by a proper trusted party. For example, a key secret may be rejected by the system if it is not accessed from a trusted memory location (e.g., a memory location used, indirectly controlled, maintained, or owned by a trusted party). Similarly, portions of key secret held by untrusted parties may be tied to specific memory locations.

Example implementations that may be used to support the techniques and architectures described above are described below. For example, the implementations discussed below may be used to construct chameleon hashes. However, other integrity codes may be used to non-tamper-evident blockchain rewrites.

Non-Interactive Zero-Knowledge

If R: $\{0, 1\}^* \times \{0, 1\}^* \to \{0, 1\}$ is an NP relation on pairs (x, y), with corresponding language L:=$\{y: \exists x \text{ s.t. } R(x, y)=1\}$, a non-interactive argument for R may allow a prover P to convince a verifier V that a common element y belongs to the language L (where both P and V are modeled as PPT algorithms). The prover P may be facilitated by knowing a witness x for y∈L.

Example Property 1 (Non-interactive argument). A non-interactive argument for an NP relation R is a tuple of efficient algorithms N/A=(I, P, V) specified as follows.

$\omega \leftarrow \$ I(1^K)$: The probabilistic algorithm I takes as an input the security parameter K∈$\mathbb{N}$, and outputs the public common reference string (CRS) $\omega$.

$\pi \leftarrow \$ P(\omega, x, y)$: The probabilistic algorithm P takes as an input the CRS $\omega$ and a pair x, y such that R(x, y)=1, and returns a proof $\pi$ for membership of y∈L.

$d=V(\omega, Y, \pi)$: The deterministic algorithm V takes as an input the CRS $\omega$ and a pair (Y, $\pi$), and returns a decision bit d ∈$\{0, 1\}$.

Non-interactive arguments may, in some cases, satisfy three properties known as completeness, zero-knowledge, and soundness, which are discussed below. The CRS may be used to facilitate non-interactive zero-knowledge conditions.

The completeness property may establish that an honest prover (holding a valid witness x) should be able to convince the verifier that y∈L.

Example Property 2 (Completeness for arguments). Let N/A=(I, P, V) be a non-interactive argument for an NP relation R. N/A may satisfy completeness if for all pairs (x, y) such that R(x, y)=1, there exists a negligible function v: $\mathbb{N} \to [0, 1]$ such that $$\mathbb{P}_{[V(\omega, y, \pi)=1:\pi \leftarrow \$P(\omega, x, y), \omega \leftarrow \$I(1^\kappa)]} \geq 1-(\kappa).$$

Zero-knowledge. The zero-knowledge property indicates that a possibly malicious verifier may not necessarily acquire knowledge of a witness that it could not acquire by itself. This may contribute to non-interactive zero-knowledge (NIZK).

Example Property 3 (Zero-knowledge). Let N/A=(I, P, V) be a non-interactive argument for an NP relation R. N/A satisfies zero-knowledge if there exists a PPT simulator S:=$(S_1, S_2)$ such that for all adversaries A there is a negligible function v: $\mathbb{N} \to [0, 1]$ such that $$\left|\mathbb{P}\left[b = b' : \frac{b' \leftarrow \$A(w, \tau, \pi_b), \pi_0 \leftarrow \$P(w, x, y), \pi_1 \leftarrow \$S_2(\tau, y)}{b' \leftarrow \$\{0, 1\}, (x, y) \leftarrow \$A(w, \tau), (w, \tau \leftarrow \$S_1(1^k)}\right] - \frac{1}{2}\right| \leq$$

$$v(k).$$

Simulation Extractability. The soundness property indicates that it is hard for a malicious prover to generate an accepting proof $\pi$ for an element $y \notin L$. In some cases soundness may still hold even if the malicious prover can access simulated proofs for true statements. In some implementations, a stricter scheme may allow the prover to see proofs of possibly false statements; see discussion below.

Example Property 4 (True-simulation extractability (tSE)). Let N/A=(I, P, V) be NIZK for an NP relation R, with zero-knowledge simulator S=$(S_1, S_2)$, and let f be an efficiently computable function. N/A satisfies true-simulation f extractability (f tSE for short) if there exists a PPT extractor E such that for all PPT adversaries A there is a negligible function v: $\mathbb{N} *[0, 1]$ such that $$\mathbb{P}\left[\begin{array}{ll} & z^* \leftarrow \$E(\tau, y^*, \pi^*) \\ y^* \notin Q \wedge (V(w, y^*, \pi^*) = 1) & : (y^*, \pi^*) \leftarrow \$A^{O_T}(\cdot, \cdot)(w) \\ \wedge \forall x^* \text{s.t. } f(x^*) = z^*(R(x^*, y^*) = 0) & (w, \tau) \leftarrow \$S_1(1^k) \end{array}\right] \leq$$

$$v(k).$$

where oracle $O_T$ takes as input pairs $(x_i, y_i)$ and returns the same as $S_2$ (T, $y_i$) as long as $R(x_i, y_i)=1$ (and $\perp$ otherwise), and Q is the set of all values $y_i$ asked to oracle $O_T$.

Note that in the above example property 4 the adversary is only allowed to see simulated proof for true statements. A stronger variant ensures that simulation extractability holds even if the adversary is allowed to see simulated proofs for possibly false statements. The latter property is also known under the name of robust NIZK.

As noted in tSE NIZK are significantly more efficient to construct, indeed they can be generically obtained combining a NIZK (such as the Groth-Sahai NIZK) with a CCA-secure PKE scheme.

Chameleon Hash Functions

A chameleon hash may include a cryptographic hash function for which a device in possession of a key secret may compute collisions. Without the key secret, the chameleon hash may be designed to make it computationally impractical to find collisions. However, knowledge of the key secret, for example, a cryptographic key, trapdoor information or other secret, may allow for computationally practical generation of collisions for the hash function.

Knowledge of the key secret may allow for collision determination and generation for blocks containing at least some arbitrary content.

Secret-Coin Chameleon Hashing

Example Property 5 (Secret-coin chameleon hash). A secret-coin chameleon hash function is a tuple of efficient algorithms CH=(HGen, Hash, HVer, HCol) specified as follows.

- $(hk, tk) \leftarrow \$ \ HGen(1^\kappa)$: The probabilistic key generation algorithm HGen takes as an input the security parameter $\kappa \in \mathbb{N}$, and outputs a public hash key hk and a key secret tk.
- $(h, \xi) \leftarrow \$ \ Hash(hk, m)$: The probabilistic hashing algorithm Hash takes as an input the hash key hk, a message $m \in M$, and implicit random coins $r \in R_{hash}$, and outputs a pair $(h, \xi)$ that consists of the hash output h and a check string $\xi$.
- $d = HVer(hk, m, (h, \xi))$: The deterministic verification algorithm HVer takes as an input a message $m \in M$, a candidate hash output h, and a check string and returns a bit d that equals 1 if $(h, \xi)$ is a valid hash/check pair for the message m (otherwise d equals 0).
- $\pi' \leftarrow \$ \ HCol(tk, (h, m, \xi), m')$: The probabilistic collision finding algorithm HCol takes as an input the trapdoor key tk, a valid tuple $(h, m, \xi)$, and a new message $m' \in M$, and returns a new check string $\xi'$ such that $HVer(hk, m, (h,\xi))=HVer(hk, m', (h, \xi'))=1$. If $(h,\xi)$ is not a valid hash/check pair for message m then the algorithm returns $\perp$.

The hashing algorithm may be randomized, and, upon input some message m, it may produce a hash output h together with a check value $\xi$ that helps verifying the correct computation of the hash given the public hash key. The random coins of the hashing algorithm are, however, secret. A particular case is the one where the check value $\xi$ consists of the random coins used to generate h, as the hash computation becomes deterministic once m and r are fixed; we call such a chameleon hash function public-coin and we define it formally below.

Example Property 6 (Public-coin chameleon hash). A public-coin chameleon hash function is a collection of algorithms CH=(HGen, Hash, HVer, HCol) specified as in Example Property 5, with the following differences:

- The hashing algorithm Hash, upon input of the hash key hk and message $m \in M$, returns a pair (h, r), where $r \in R_{hash}$ denote the implicit random coins used to generate the hash output.
- The verification algorithm HVer, given as input the hash key hk, message m, and a pair (h, r), returns 1 if and only if Hash(m; r)=h.

Since the verification algorithm simply re-runs the hashing algorithm, some implementations may drop the verification algorithm from CH in the case of public-coin chameleon hashing.

Example Property 7 (Correctness for chameleon hashing). Let CH=(HGen, Hash, HVer, HCol) be a (secret-coin or public-coin) chameleon hash function with message space M. CH satisfies correctness if for all $m \in M$ there exists a negligible function $v: \mathbb{N} \to [0, 1]$ such that:

$$\mathbb{P}[HVer(hk, m, (h,\xi))=1:(h,\xi) \leftarrow \$Hash(hk,m); (hk,tk) \leftarrow \$HGen(1^K)] \geq 1 - v(k).$$

Virtually any chameleon hash may be used to produce a public-coin collision-resistant chameleon hash. However, in some cases, secret-coin chameleon hash functions can be used for the same applications as public-coin ones, in particular for constructing chameleon signatures and online/offline signatures. However for a secret-coin chameleon hash the system may store the check value $\xi$ (instead of the randomness r) in order to verify a hash output. Further, and the hash verification may not necessarily include re-computing the hash.

Collision resistance may not necessarily be sufficient for some of the applications of chameleon hash. While the hash function is collision-resistant, a party seeing a collision for the hash function may be able to find other collisions or recover the key secret. Added collision resistance, can be used to make it more difficult to find collisions even after witnessing polynomially-many collisions.

Another type of chameleon hashing may include "labeled" hash functions, where the hash algorithm takes as input an additional value $\lambda$ called the label or tag. In some cases, labeled hash functions may be resistant to key exposure. For example, for some labeled hash functions it is unfeasible for a system to find collisions for a "fresh" label $\lambda^*$, even given access to an oracle that outputs collisions for other arbitrary labels $\lambda \neq \lambda$. Identity-based chameleon hash functions may, at least partially, address the key exposure problem because they use a trusted party to process identities.

Added Collision Resistance. An example of a collision for a secret-coin or public-coin hash function is a tuple $h, (m,\xi)$, $(m', \xi')$ such that $m \neq m'$ and $(h,\xi)$ and $(h,\xi')$ are valid hash/check pairs for m and m' (respectively). For a chameleon hash function the following security property, which indicates that it should be hard to find collisions for the hash function even given access to the collision finding algorithm (returning collisions for adaptively chosen hash outputs).

Example Property 8 (Added collision resistance). In an example scenario, CH=(HGen, Hash, HVer, HCol) may be a (secret-coin or public-coin) chameleon hash function. CH may satisfy the properties of added collision resistance if for all PPT breakers B, there exists a negligible function $v: \mathbb{N} \to [0, 1]$ such that $$\mathbb{P}\left[\begin{array}{c} HVer(hk, m, (h, \xi)) = HVer(hk, m', (h, \xi')) = 1) \quad : \quad (h, (m, \xi), (m', \xi')) \leftarrow \$B^{O_{hk,tk}}(\cdot)(hk) \\ \wedge (m \neq m') \wedge (h \notin Q) \qquad\qquad\qquad (hk, tk) \leftarrow \$HGen^{(1^k)} \end{array}\right] \leq v(k).$$

where the set Q is the set of all hash outputs queried by B to its oracle, and oracle $O_{hk,tk}$ is defined as follows: Upon input a collision query of the form $((h, m, \xi) \ m')$ run $HVer(hk, m, (h,\xi)):=d$; if d=1 return the output of $HCol(tk, (h, m, \xi), m')$, otherwise return $\perp$. If B is not allowed to query oracle $O_{hk,tk}$, CH may be collision-resistant without necessarily having added collision resistance.

Generic Transformation

Example chameleon hash functions that provide added collision resistance include hash functions based on the Nyberg-Rueppel signature scheme. The security of these example chameleon hash functions can be demonstrated using a discrete logarithm assumption within in the "generic group model."

The example construction below is for a chameleon hash based on Nyberg-Rueppel principles. Added collision resistance may be achieved in a non-ad hoc fashion for a variety of different complexity environments. The transformation may be based on a CPA-secure PKE scheme and with tSE NIZK.

Let CH=(HGen, Hash, HCol) be a public-coin chameleon hash function (with message space $M_{hash}$ and randomness space $R_{hash}$), let PKE=(KGen, Enc, Dec) be a PKE scheme (with message space $R_{hash}$ and randomness space $R_{pke}$), and let N/A=(I, P, V) be a non-interactive argument system for the language $L_{CH}$={(pk, c, hk, h, m): ∃(r, ρ) s.t. h=Hash(hk, m; r)^c=Enc(pk, r; ρ)}. (1) An example secret-coin chameleon hash function CH*=(HGen*, Hash*, HVer*, HCol*) may be specified as follows:

HGen*($1^K$): Run (hk, tk)←\$ HGen($1^K$), (pk, sk)←\$ KGen($1^K$), and ω←\$ I($1^K$). Return the pair (hk*, tk*), such that hk*:=(hk, ω, pk), and tk*:=(tk,sk).

Hash *(hk*, m): Sample a random value r∈$R_{hash}$ and run Hash(hk, m; r):=h. Sample a random value ρ∈$R_{pke}$ and run c:=Enc(pk, r; ρ). Compute the proof π←\$ P(ω, x, y), where x:=(r, ρ) and y:=(pk, c, hk, h, m), and return (h,ξ) such that ξ:=(c, π).

HVer*(hk*, m, (h,ξ)): Parse ξ=(c, π) and return the output of V(ω, y, π) where y=(pk, c, hk, h, m).

HCol*(tk*, (h, m,ξ), m'): First run HVer(hk*, m, (h,ξ)):=d; if d=0 then output ⊥, otherwise, decrypt the randomness r:=Dec(sk, c), compute a collision r'←\$ HCol(tk, (h, m, r), m'), sample a random ρ'∈$R_{pke}$ and encrypt the new randomness c':=Enc(pk, r'; ρ'). Compute the proof π'←\$ P(ω,x', y'), such that x':=(r', ρ') and y':=(pk, c', hk, h, m'), and return ξ':=(c',π').

The system may be implemented using various protocols. For example, public-coin chameleon hash function based system may implement Sigma-protocols. A Sigma-protocol is an interactive proving scheme, in which the "prover" and the "verifier" engage in a multiple-stage communication. During the multiple-stage communication, the prover may convince the verifier that prover is in possession of specific information. To achieve tSE NIZK, a CCA-secure PKE NIZK argument system may be used. An encryption scheme is CCA-secure when it is secure against a pre-defined ciphertext attack.

Example Blockchain

In an example scenario, block is a triple of the form B=(s, x, ctr), where s∈$\{0, 1\}^k$, X∈$\{0, 1\}^*$ and ctr∈ℕ. Where B is valid if:

$$validblock_q^D(B):=(H(ctr,G(s,x))<D)\char`\^(ctr<q)=1.$$

Where H: $\{0, 1\}^* \to \{0, 1\}K$ and G: $\{0, 1\}^* \to \{0, 1\}^K$ are collision resistant hash functions and the parameters D∈ℕ and q∈ℕ are the block's difficulty level and the maximum number of hash queries that a user is allowed to make within a round of the protocol, respectively.

The example blockchain, C, may be a chain (or sequence) of blocks. In the example, the rightmost block is the head of the chain, denoted by Head(C). Any chain C with a head Head(C):=(s, x, ctr) can be extended to a new longer chain C':=C∥B' by attaching a (valid) block B':=(s', x', ctr') such that s'=H (ctr, G(s, x)); the head of the new chain C' is Head(C')=B'. A chain C can also be empty, and denoted as C=ε. The function len(C) denotes the length (number of blocks) of a chain C. For a chain C of length n and any k≥0, $C^{\lceil k}$ is the chain resulting from removing the k rightmost blocks of C, and analogously $^{k\rceil}C$ is the chain resulting in removing the k leftmost blocks of C, if k≥n then $C^{\lceil k}$=ε and $^{k\rceil}C$=ε. If C is a prefix of C', it may be denoted CpC'. Further, the difficulty level D may differ among blocks in a chain.

Example Rewritable Blockchain

In an example rewritable blockchain scenario for the example blockchain above, a block may be a tuple B:= $\langle s,x,ctr,(h,\xi)\rangle$, the new component (h,ξ) may be a hash/check pair for a secret-coin chameleon hash. The function G may be a secret-coin chameleon hash CH=(HGen, Hash, HVer, HCol). The validation predicate for this modified block may be:

$$validblock_q^D(B):=(H(ctr,h)<D)\char`\^(HVer(hk,(s,x),(h,\xi)))\char`\^(ctr<q)=1.$$

The domain of the chameleon hash may be adjusted, for example, to a size commensurate to the application of the blockchain by hashing the input of the argument, Hash, with a regular collision resistant hash of the desired output size.

The verification of a chameleon hash may be computed using its own verification function (HVer). However, some hash functions, such as those without key secrets, may be verified by precomputing the hash.

In some cases, a chain redacting algorithm, such as example algorithm 1, may take as an input: a chain C to be redacted, a set of indices that represents the positions (in the chain C) of the blocks that are being redacted, and another set containing the new x''s values for the individual blocks that are being redacted. The example algorithm may accept chameleon hash trapdoor key tk as an input. The algorithm intuition is that for each block to be redacted we compute a collision for the hash of the block with its new content x'. A new chain C' is created by replacing the original block with its modified counterpart. At the end of the execution of Algorithm 1, the central authority may broadcast the new redacted chain as a special chain, such that the users of the system adopt the new redacted chain in favor of other chains even, for example, longer ones.

---

Algorithm 1: Chain Redaction

--- input : The input chain C of length n, a set of block indices 1 ⊆ [n], a set of x's values $\{x'_i\}_{i\in I}$, and the chameleon hash trapdoor key tk.
output: The redacted chain C of length n.
C' ← C;
Parse the chain C' as ($B_1$, ... , $B_n$);
for i := 1 to n do
  if i ∈ l then
    Parse the i-th block of C' as $B_i := \langle s_i, x_i, ctr_i, (h_i, \xi_i)\rangle$;
    $\xi_i'$ ← HCol(tk,($h_i, s_i \| x_i, \xi_i$),($s_i \| x_i'$));
    $B_i' := \langle s_i, x_i', ctr_i, (h_i, \xi_i')\rangle$;
    $C^i \leftarrow C^{\lceil i} \| B_i' \|^{i\rceil} C$;
  end
end
return C'

---

In some cases, collision resistant chameleon hash functions may be susceptible to key exposure. For example, for some collision resistant chameleon hash functions it may be possible to retrieve the key secret after seeing collisions for the function. Note that both algorithms presented (Algorithm 1 and 2) may expose one or more collisions for a redaction. For example, an algorithm may expose a collision for redaction or for each block changed or redacted. In some cases, a system may implement a chameleon hash with added collision resistance to avoid key exposure. However, some systems may rely on collision resistance and controlled levels of collision exposure.

In some cases, a trusted party may remove entire blocks from a rewritable blockchain. For example, a use case may be scalability maintenance, such as saving disk space and computational power relative to what may be used to handle larger (unredacted) chains. To remove the block $B_i$, the block $B_{i+1}$ may be altered by assigning $s_{i+1} \leftarrow s_1$. The system may then compute a collision for $B_{i+1}$ that produces the new block $B'_{i+1}$ which may be inserted in the chain in place of block $B_{i+1}$, which leaves the chain in a coding-consistent state. At the end of the execution of Algorithm 2, the central authority may broadcast the new shrunken chain as a special chain, such that the users of the system adopt the new redacted chain in favor of other chains.

---

Algorithm 2: Chain Shrinking

--- input : The input chain C of length n, a set of block indices $l \subseteq [n]$ and the chameleon hash trapdoor key tk.
output: The new chain C' of length n − |l|.
C' ← C;
Parse the chain C' as $(B_1, \ldots, B_n)$;
for i := 1 to n do
  if i ∈ l then
    Parse the i-th block of C' as $B_i := \langle s_i, x_i, ctr_i, (h_i, \xi_i) \rangle$ ;
    Parse the i +1-th block of C' as $B_{i+i} := \langle s_{i+1}, x_{i+1}, ctr_{i+1}, (h_{i+1}, \xi_{i+1}) \rangle$ ;
    $\xi_{i+1}' \leftarrow HCol(tk, (h_{i+1}, s_{i+1} \| x_{i+1}, \xi_{i+1}), (s_i \| x_{i+1}))$;
    $B_{i+1}' := \langle s_i, x_{i+1}, ctr_{i+1}, (h_{i+1}, \xi_{i+1}') \rangle$ ;
    $C' \leftarrow C'^{[i} \| B_{i+1}' \|^{i+1]} C'$;
  end
end
return C'

---

Decentralized Key Secret Exchange

In some implementations, a candidate trusted authority may be apparent. For example, in some financial interactions, a bank or bank official may hold a key secret for the integrity code, such as a chameleon hash. In some cases, peer-to-peer applications may not necessarily have such a clear candidate trusted party. This situation may be addressed by using a decentralized key secret distribution scheme. In this case, the trapdoor key may not necessarily be known by any individual party, but rather be shared among some fixed set of users, such that the users together makeup the trusted party. When a block needs to be redacted, the users from this set engage in a secure multiparty computation protocol (MPC) to compute Algorithm 1.

In some cases, secure key exchanges, such as MPCs, may operate by having the parties send a start signal. In some cases, some parties may be honest or dishonest. Honest parties may aim to work with the other parties to access the complete key secret. However, dishonest parties may wish to disrupt the process by sending false shares. Nevertheless, the secure key exchange still may involve receiving shares with both honest and dishonest parties. After receiving the "start" signal from all honest parties, a system may run (hk, tk)←\$ HGen($1^K$) and send hk to the dishonest party. Accordingly, the individual parties in the exchange $P_i$ may receive shares. The system may construct a complete set of shares ($s_1 \ldots s_n$) from honest parties because the shares sent by the dishonest parties may constitute an unqualified set. Once, a complete set is formed, the system may send $s_i$ to each honest party.

The system may receive the shares $s_i$ from each party $P_i$ and reconstruct the trapdoor key tk:=Rec($s_1, \ldots, s_n$). The shares of the dishonest parties are chosen by the dishonest party. Upon receiving a "compute collision" signal for the pair ((h, m, ξ), m') from all honest parties, compute ξ'←HCol(tk, (h, m, m')) and send (h, m, ξ) and ξ' to the dishonest party. Upon receiving an "OK" signal from the dishonest party, the system may forward the value ξ' to all honest parties. However, if an "OK" is not received, the system may forward ⊥ (e.g., a runtime failure indicator) to all honest parties.

In an example scenario, an example system may include n active users. A subset U∈[n] of users may hold a share of the trapdoor key tk. The subset U of users may execute a decentralized key generation protocol. At the end of the run, users in the subset U get a share $s_i$ of tk. When a block $B_k$:= $\langle s, x, ctr, (h, \xi) \rangle$ is redacted into the modified block $\tilde{B}_k$ := $\langle s, \tilde{x}, ctr, (h, \tilde{\xi}) \rangle$ the users may inspect their own blockchains and find block $B_k$. The users in the subset may then execute the distributed hash collision protocol to compute the value $\tilde{\xi}$. The users may input their own private share $s_i$ of tk, the values s, x, h, ξ and $\tilde{x}$. At the end of the protocol, the users in subset U receive the value $\tilde{\xi}$ of block $\tilde{B}_k$. The users may update their own blockchain by replacing block $B_k$ with block $\tilde{B}_k$ and broadcast this new rewritten chain. In some cases, the users may broadcast the new chain as a new special chain. In some implementations, rewrites to the blockchain may occur infrequently. Use of special chain broadcasts may not necessarily cause frequent disruption. However, special and non-special transmissions may be used in various implementations.

An example choice for the set U would be to pick a subset of users that are online. However, this choice can be dependent on the application. We also deal with the issue where some users in U are in fact malicious, and their goal is to learn tk or to prevent its correct reconstruction.

Concrete Instantiations

In some example implementations, chameleon hash (CH) constructions that are described in: Giuseppe Ateniese and Breno de Medeiros, "On the key exposure problem in chameleon hashes", SCN, pages 165-179, 2004 may be used by the system. As discussed above, an example CH construction that may be implemented has a twin Nyberg-Rueppel signature along with added collision resistance, for example a CH that exhibits example property 8. The parameters for the function may include a random prime q and p=2q+1. The parameters may further include a generator g of the subgroup of quadratic residues $Q_p$ of $\mathbb{Z}^*_p$, and a collision resistant hash function H.

(hk, tk)←\$ HGen($1^K$): The key secret is a random value tk∈[1, q−1], and the hash key is hk←$g^{tk}$.

h:=Hash(m, r, s): To hash a message m∈M with random values (r, s)∈$\mathbb{Z}_q \times \mathbb{Z}_q$ compute and return h:= r−($hk^{H(m,r)} g^s$ mod p) mod q.

{0, 1}:=HVer(h, m, r, s): To verify just return Hash(m, r, s)=h.

(r', s')←$ HCol(h, m, r, s, m'): To compute a collision for message m', pick a random k∈[1, q−1], compute r'←h+ ($g^k$ mod ρ) mod q, and compute s'←k−H (m', r')·tk mod q. Return (r', s').

Semi-honest Scenario. In an example scenario, the users in subgroup U are semi-trusted. In this scenario, the semi-honest users in subgroup U may be trusted to execute the protocol and behave according to the rules, for example, the users in subgroup U may be relied upon to input the correct shares. For this semi-honest scenario, a n-threshold key secret sharing scheme based on sums is described below:

Sharing phase:

The dealer chooses a secret s and n shares $s_i$ such that $$s = \sum_{i=1}^{n} s_i.$$

The n parties $P_i$ receive their respective key secret shares $s_i$.

Reconstruction phase:

The dealer receives from the parties $P_i$ a share $s_i$ and reconstructs the key secret $$s = \sum_{i=1}^{n} s_i.$$

In the example scenario, the users u∈U individually choose a random $x_i$∈[1, q−1] as their respective key secret shares and broadcast the value $y_i$←$g^{x_i}$. The hash trapdoor key may be tk←$\sum_{i=1}^{n} x_i$ mod q, and the hash key may be hk←$g^{tk}$. This protocol may be non-interactive because it may not necessarily require any exchange of messages among the users. Further, no set of n−1 users may necessarily be able reconstruct tk. Further, the system may frustrate attempts to learn information about tk because the shares are just random elements.

In the example scenario, the users u ∈ U may agree on a pair ((h, m, r, s), m'). The users individually choose a respective random $k_i$∈[1, q−1], broadcast $g^{k_i}$, and later compute r'←h+($\prod_{i=1}^{n} g^{k_i}$ mod p) mod q. In some cases, the systems of the individual users may compute h'←H (m', r') without necessarily receiving additional input from the other users in the subgroup. To compute s' the users may execute a MPC protocol to compute the multiplication s''←h'·tk by inputting the users respective shares of tk. The user may execute an additional and another MPC protocol to compute the difference s'←k−s'' by inputting the previously chosen shares of k.

Dishonest Scenario. Additionally or alternatively, an example scenario may include some users, entities, parties, devices, or other entities, that may be dishonest. For example, dishonest users may deviate from a protocol specification to attempt to learn other users' key secret shares. To maintain security in such scenario robust secret sharing schemes may be implemented for key secret sharing. In some cases, robust secret sharing may support a threshold number (e.g., an integer t<n) of users that may be dishonest. A user executing a robust secret sharing may reconstruct the correct key secret from the given shares even if (up to) the threshold number of users are dishonest. A robust secret sharing scheme may be implemented using a Shamir secret sharing scheme plus Reed-Solomon (RS) error correcting code. In the key secret reconstruction phase, the RS codes are used in each share before reconstructing the key secret. In some cases, a Shamir secret sharing scheme paired with RS error correction may operate with up to one third of the users being actively dishonest. In some example schemes, any dishonest user threshold may be supported, for example, this may include a threshold that allows just short of a majority of users to be dishonest.

The users in the subgroup may chose a respective random string $\rho_i \in$ and parses it as $p_i$:=$tk_i \| p_1 \| p_2^2 \| L \| p_i^n$, so that the subgroup may agree on a polynomial P (X). The polynomial may be defined as P(X):=tk+$P_1 \cdot X$+$P_2 \cdot X^2$+ . . . +$P_{n-1} \cdot X^{n-1}$, with P(i):=$\sum_{j=1}^{n} p_i^j$ and P(0):=$\sum_{i \in [n]} tk_i$. To distribute the shares, the users may execute a MPC protocol to compute the shares of each user i. For a user i, the corresponding share maybe the sum P(i):=$\sum_{j=1}^{n} p_i^j$. In the reconstruction phase, the shares of the users may be decoded using RS codes.

In some implementations, sharing schemes such as those described in Tal Rabin and Michael Ben-Or, "Verifiable secret sharing and multiparty protocols with honest majority (extended abstract)", ACM STOC, pages 73-85, 1989 may be used. For example, sharing schemes discussed therein may use a broadcast channel and be capable of successful operation where a majority of parties are honest.

Further, some implementations, may use schemes such those with an optimizable share size described in: Allison Bishop, Valerio Pastro, Rajmohan Rajaraman, and Daniel Wichs, "Essentially optimal robust secret sharing with maximal corruptions" IACR Cryptology ePrint Archive, 2015: 1032, 2015 may be used. For example, sharing schemes discussed therein may have corruption settings that lack linear dependence between the share size and the number of parties, n. In some cases, the share size may grow linear with k, where $2^{-k}$ is the probability of failure.

Structure at the Block Level

Figure 8:
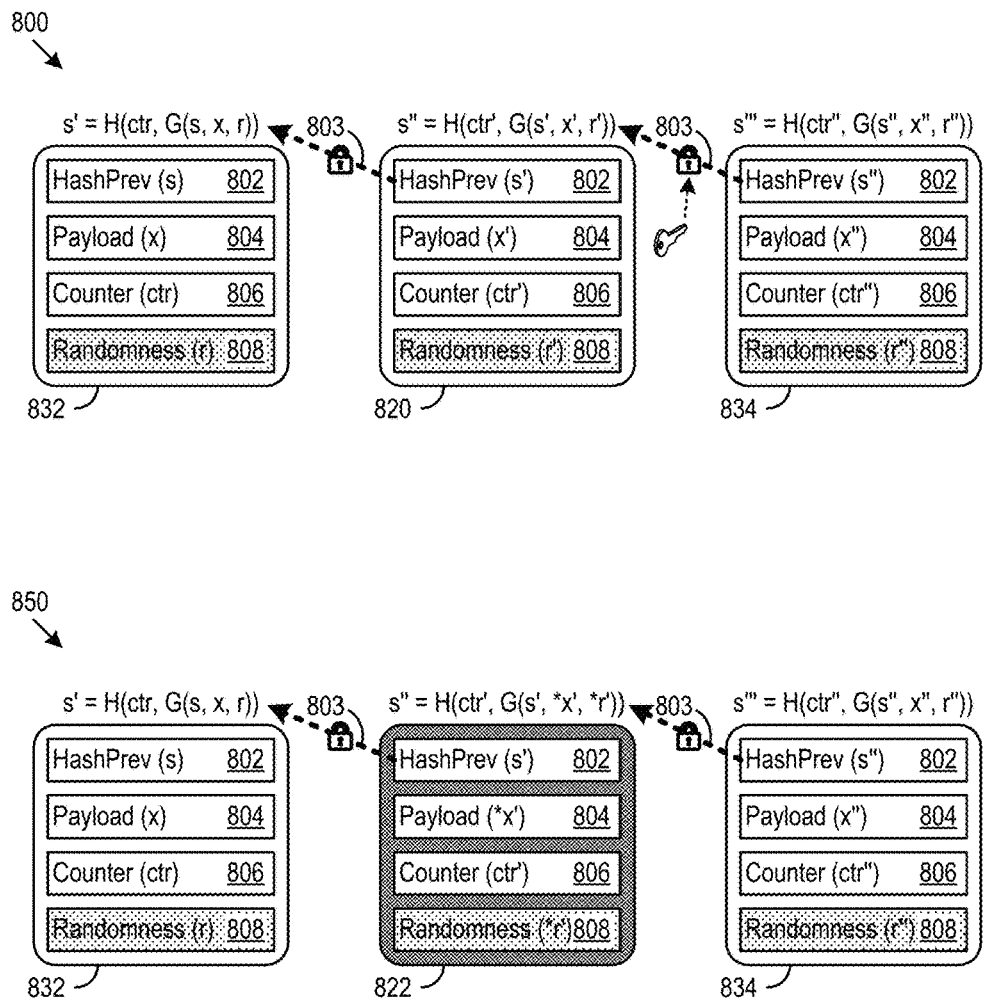
FIG. 8 shows an example blockchain portion paired with an example updated blockchain portion.

FIG. 8 shows an example blockchain portion 800 paired with an example updated blockchain portion 850. In the example, blockchain portions 800, 850 an outer hash H is paired with an inner hash G. The inner hash may be nested within the outer hash such that the output of the inner hash is provided to the outer hash as an input. In the example, blockchain portion, the inner hash G may be a chameleon hash function. The outer hash H may be a chameleon hash function or another hash function. The blocks may include a HashPrev (e.g. previous hash) 802 field which may include a store for holding the hash output corresponding to the previous block, for example s, s', s''. The blocks 820, 822, 832, 834 may not necessarily include a hash output of their own input. However, the hash output for the blocks is shown above the block to demonstrate the linkage 803 to the next block (e.g., the linkage 803 between block 832 and 820 and between 820 and 834). The blocks 820, 822, 832, 834 may further include a Payload 804 field which may hold data (e.g., x, x', x") secured within the block, such as, transaction information, smart contract content, numerical values, currency denominations, or other secured data.

A counter field 806 may also be included, for example ctr, ctr', ctr". The counter field 806 may include a counter or nonce that may be used for proof of work (PoW) computation, accounting, block tracking, or other purposes. In cryptocurrency implementations, PoW may be used to verify the validity of a currency award to a particular party. PoW may include solutions to computational problems where the solutions a computationally complex to derive, but comparatively computationally simple to verify. PoW may also be used in smart contracts to verify that a particular party has completed their obligations under the contract.

The Randomness 808 field may be updated when the block is redacted, for example, when a collision is computed. In some cases the Randomness field may hold the third data, (e.g., r, r', r'') that may be paired with the replacement data to allow a non-tamper-evident rewrite to the blockchain. When a block 820 is redacted, the values s', x', ctr', and r' may be replaced by s', *x', ctr', and *r'. In the example scenario, s' and ctr' may not necessarily be modified since ctr' may be used by the outer hash to compute the PoW and is the link to the previous block that remains the same. Using a chameleon hash key secret for the inner hash function G, it may be possible to find a collision such that G(s', x', and r')=G(s', *x', and *r'). Accordingly, H(ctr', G(s', x', and r'))=H(ctr', G(s', *x', and *r'). As a result s'' may remain unchanged through redaction. The updated block portion 850 includes the replacement block 822 with values *x' and *r'.

In some implementations, the system may delete a block by replacing $s_{i+1}$ with $s_i$ in $Block_{i+1}$ and then running the redaction process on $Block_{i+1}$. Additionally or alternatively, the system may delete a block by making the value $s_{i+1}$ in $Block_{i+1}$ point to $Block_{i-1}$. In some cases, the ctr value in $Block_{i-1}$ may be changed to maintain coding-consistency with the updated value $s_{i+1}$ in $Block_{i+1}$.

Multiple Chain Blockchain

In some implementations, a trusted entity may perform a redaction that may be concealed and users may be unaware that a new blockchain has replaced the original blockchain. That is, users may not necessarily be able to detect whether parts of the blockchain were redacted or not unless old copies of the blockchain could be restored.

However, in some implementations, it may be advantageous to make redactions evident. For example, tamper-evident redactions may be advantageous in systems where redactions are audited, where previous agreement calls for evidence when redactions are performed, or in other cases when evidence of redaction is advantageous or otherwise preferable. In systems that are redaction evident, content removal or modification may leave a rewrite identifier or "scar" (e.g., a rewrite artifact) that may not necessarily be removable by anyone including the trusted parties. However, in some implementations, the scar may be removable by a subset of the trusted parties or through coordination of multiple parties, as discussed below.

In some redaction evident implementations, a single blockchain may include chains, one based on the write-locked chain, e.g., a hash function that lacks a key secret or a hash function for which the key secret is unknown, and one based on a rewritable blockchain, e.g., a chameleon hash. If in both chains the write-locked and rewritable chains are intact, then there was no redaction and the blocks are original. If the write-locked chain is broken and the chameleon chain is intact, then there was a redaction by a trusted entity. However, if the rewritable chain is broken, then there was an edit to the blockchain by an untrusted entity and the blockchain may be invalidated. In some cases, if the rewritable chain is broken, the blockchain may be invalidated regardless of the state of the write-locked chain. Accordingly, in such cases, the integrity of the blockchain is ensured by the chameleon chain while the write-lock chain acts as a detection mechanism. Thus, in blockchains supporting rewrites with scar evidence, the validity of the blockchain is logically separated from the creation of a record of tamper.

In some implementations, multiple chains may be used to differentiate among different trusted entities. Accordingly, multiple rewriteable chains may be included in a blockchain along with zero or more write-locked chains. In a multiple-trusted entity tracking blockchain, the chain corresponding to the trusted entity that made the redaction will be unbroken while other chains, include chains corresponding to other trusted entities or write-locked chains may be broken. In some implementations, the inclusion of multiple rewritable chains provides the tamper scar or rewrite identifier without an accompanying write-locked chain since only the chain corresponding to the trusted entity that made the edit may be left unbroken, while the other chains, although rewritable by other trusted entities, may be broken as a result of the edit. In some cases, a scar may be later removed when another trusted entity or entities in possession of the key to one or more of the other chains ratifies the edits made by the earlier trusted party. This may protect the blockchain from untraceable unilateral edits by one trusted party, but still allow a single trusted party to remove sensitive information quickly without coordination among multiple parties.

Further, in some schemes, some trusted entities may be authorized to make edits without scars, while other trusted parties may leave scars when making edits. For example, in a multiple rewritable chain scheme, one trusted party may have a key for all chains while other parties have keys for only a portion of the chains. A party with all keys may make edits without scars, while parties with only a portion of the keys may leave scars when editing. The multiple chain scheme may be combined with the distributed key schemes, such that, parties may aggregate their keys to make edits without scars in case where the parties would leave scars when acting alone.

Figure 9:
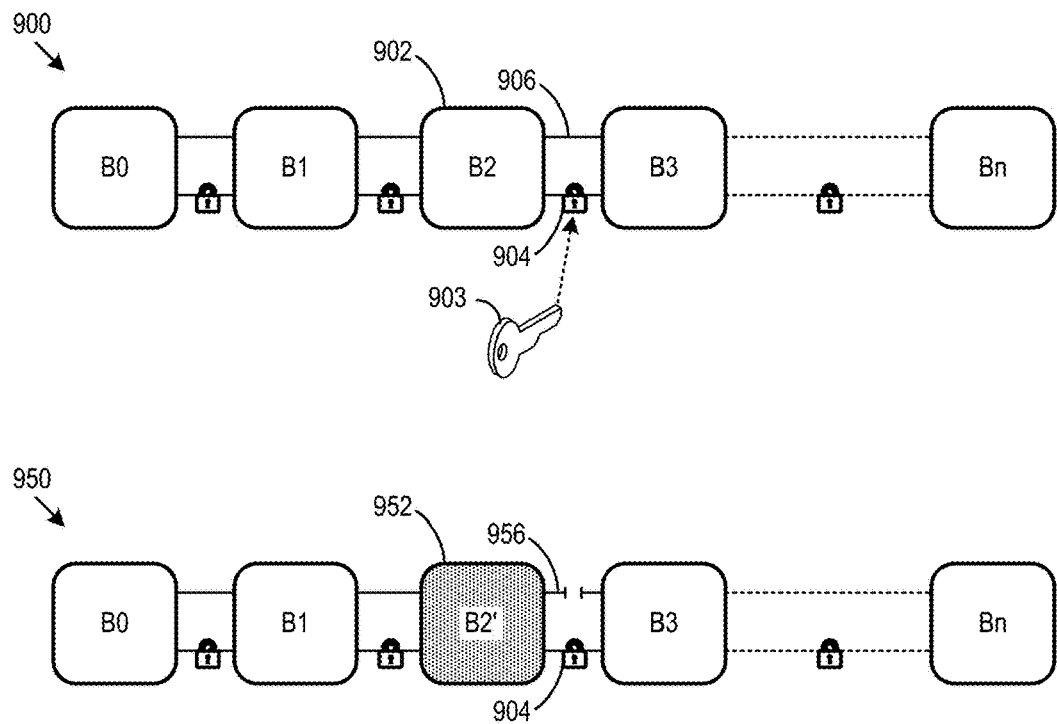
FIG. 9 shows an example dual-link blockchain portion.

FIG. 9 shows an example dual chain blockchain portion 900, 950, where the block B2 902 is modified. The key secret 903 held by the one or more trusted parties allows the trusted parties to open the link 904 and change the block B2 902. However, the write-locked link 906, or other link for which the trusted party lacks the key, may be broken to signal that a redaction took place. Referring to 950, the old block B2 902, with possibly sensitive information may be removed, but the broken link 956 acts as an indelible mark or scar that provides a persistent record that a redaction to produce new block B2' 952 took place.

Multiple chain blockchains may also be used to generate a hybrid blockchain with non-rewriteable blockchain space paired with rewritable blockchain space. For example, a system may secure a first of each block in of a set of blocks in a blockchain with an integrity code that lacks a key secret. Accordingly, any attempt by any party to rewrite these parts of the blocks would be tamper evident. The example system may secure remaining parts of the blocks with an integrity code that supports rewrites by trusted parties. These rewritable portions could be altered by trusted parties without generating evidence of tamper. Accordingly, a hybrid blockchain may be used by operators to generate a blockchain system with immutable core data that is paired with tertiary data that may be rewritten by a limited number of trusted parties.

Figure 10:
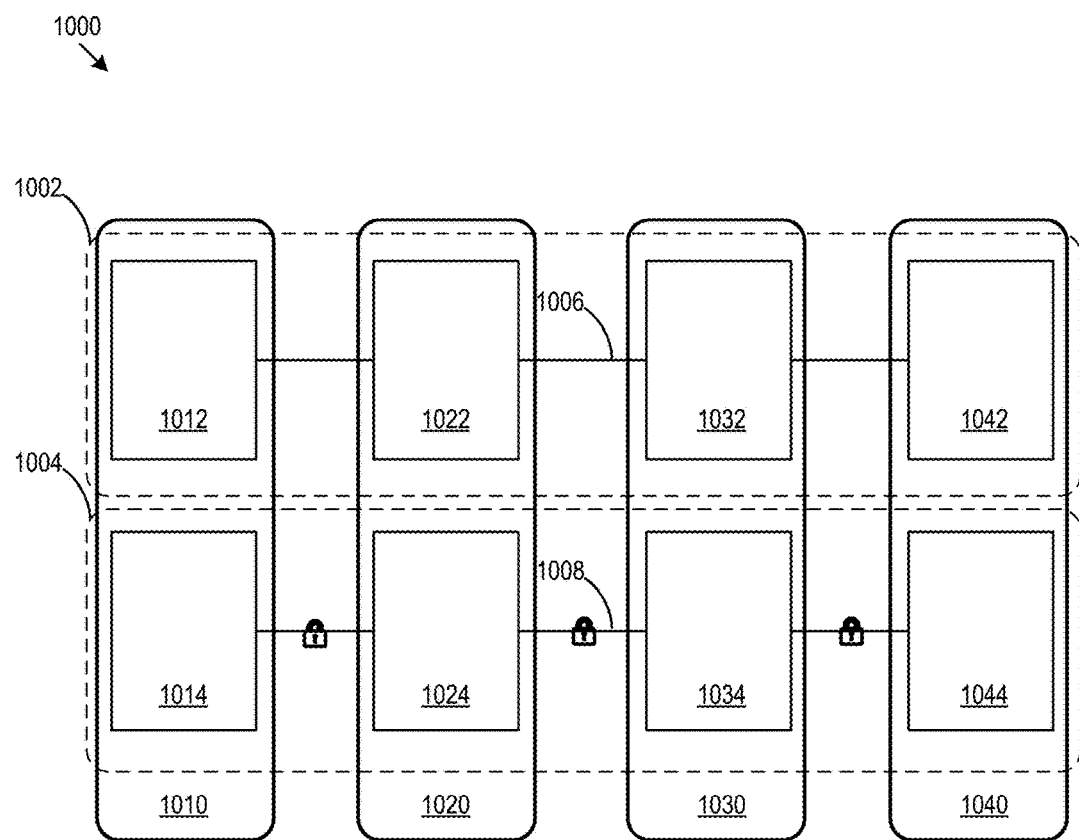
FIG. 10 shows an example hybrid blockchain.

FIG. 10 shows an example hybrid blockchain 1000. The hybrid blockchain 1000 includes blocks 1010, 1020, 1030, 1040 with a core 1002 part and a tertiary part 1004. The block portions 1012, 1022, 1032, 1042 making up the core part 1002 are secured by a core integrity code 1006 which may not necessarily support non-tamper-evident rewrites by any party. Conversely, the block portions 1014, 1024, 1034, 1044 making up the tertiary parts 1004 of the blocks 1010, 1020, 1030, 1040 may be secured by a tertiary integrity code 1008 that supports non-tamper-evident rewrites.

In various implementations, the core 1006 and tertiary 1008 integrity codes may themselves implement multiple chains. For example, the core integrity code 1006 or the tertiary integrity code 1008 may support scarring, as discussed above, such that valid rewrites may be performed on the parts 1002, 1004, but those changes still generate evidence of tampering despite being valid. Additionally or alternatively, the core 1006 and tertiary 1008 integrity codes may support multiple-trusted-party ratification, or require different numbers of key secret portions to support editing. For example, edits to the core parts 1002 may depend on ratification by two trusted parties to perform a non-tamper evident rewrite, while non-tamper-evident edits to the tertiary portion may be performed by a single trusted party. For distributed key secret systems, an example system may allow a non-tamper-evident rewrite to the tertiary part 1004 using M portions of the key secret, while only allowing non-tamper-evident rewrites to the core part 1002 when N portions of the key secret are combined (where N>M).

In an example scenario, the hybrid blockchain could be used to construct a ledger with fully immutable transaction data that is paired with transaction description/comment data that may be rewritten by a select group of curators for the ledger. In some cases, the ledger entries may include size caps or constraints in the type of data that may be entered. Constraining allowed rewrites may frustrate attempts to write irrelevant or malicious content into the immutable ledger portions of the blocks. The description/comment field within the rewritable portions of the blocks may be subject to fewer entry restrictions. However, the curators may alter or remove previously written content in the description/comments fields without the changes being tamper evident.

Figure 11:
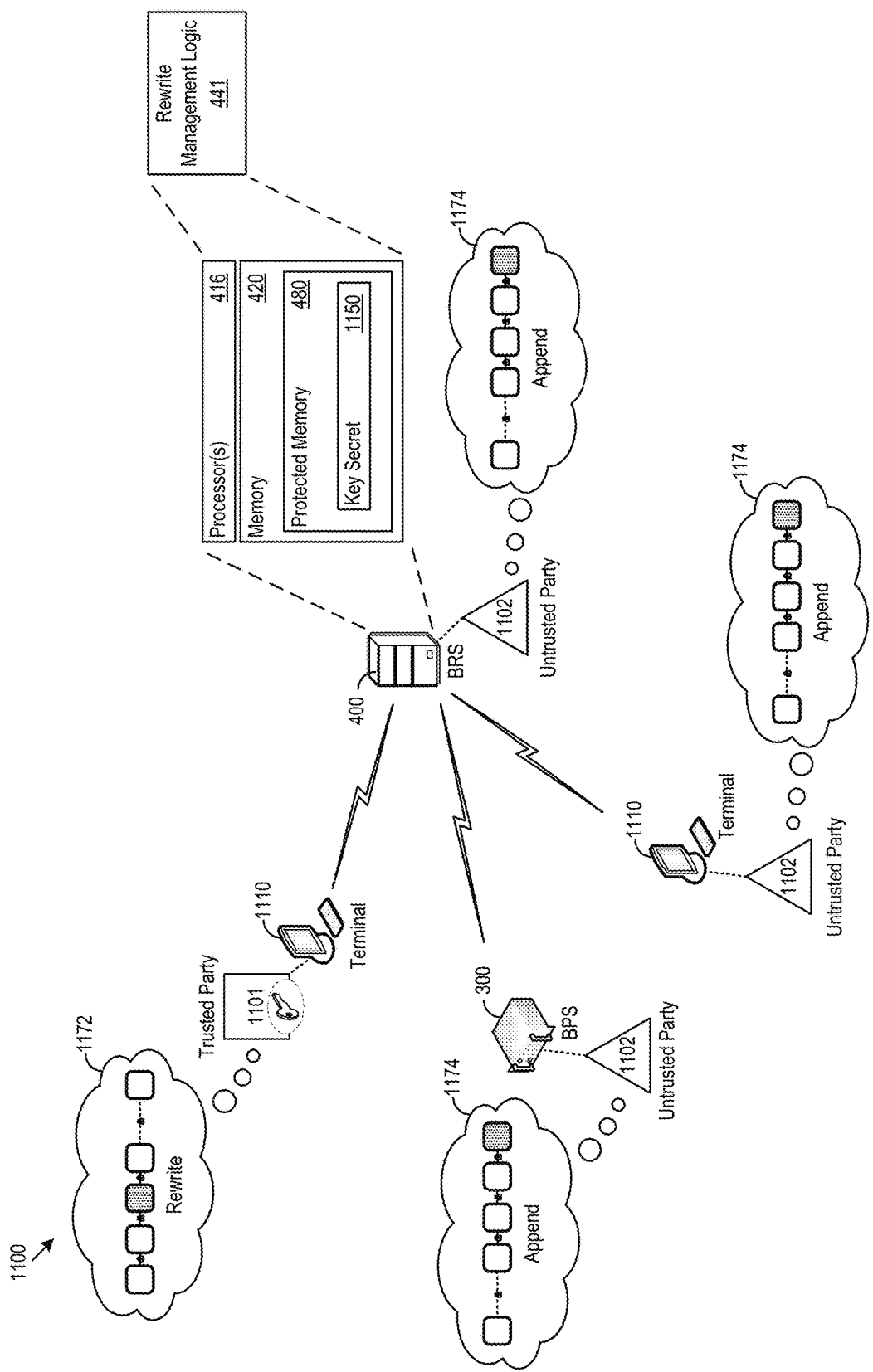
FIG. 11 shows an example rewritable blockchain scenario.

FIG. 11 shows an example rewritable blockchain scenario 1100. In the rewritable blockchain scenario 1100, a trusted party 1101 in control of a key secret 1150 (or master key secret) may perform rewrites 1172 on its own authority. For example, the trusted party may be in full control of the key secret, because the trusted party does not necessarily have to coordinate with other parties to perform rewrites 1172. The trusted party 1101 may control a BRS 400, e.g. directly or from one or more terminals 1110, the BRS 400 may store the key secret 1150 in memory 420 (e.g., protected memory 480) or access/receive the key secret 1150 from remote locations, such as terminals 1110, cloud storage, or other network locations. The terminals 1110 may include various communication devices such as, computers, webservers, laptops, cellular telephones, smartphones, tablets, internet connected appliances, internet of things devices, or other communication devices. The BRS 400 may execute RML 441 and/or rewrite logic 600 to preform blockchain rewrites 1172. Untrusted parties 1102 may access the BRS 400, other BRSs 400 systems, terminals 1110, or BPSs 300 which may verify the blockchain and/or append blocks 1174 (e.g., adding new blocks to the end of the blockchain).

Some untrusted parties may control BRSs 400, including the BRS 400 under control of the trusted party. However, the untrusted parties are unable to access the stored key secret 1150. For example, some untrusted parties may lack user account authority on the BRS 400 to access the key secret 1150 of the trusted party, but may still have access to other functions of the BRS 400. Additionally or alternatively, untrusted parties, with respect to a first rewritable blockchain, may serve as trusted parties with regard to other blockchains. Accordingly, a single BRS 400 may provide rewrite operations 1172 to multiple different trusted parties for multiple different blockchains.

The BRS 400 may access blockchains. When instructed under the authority of the trusted party, the BRS 400 may perform rewrites on the accessed blockchains using the key secret 1150.

Figure 12:
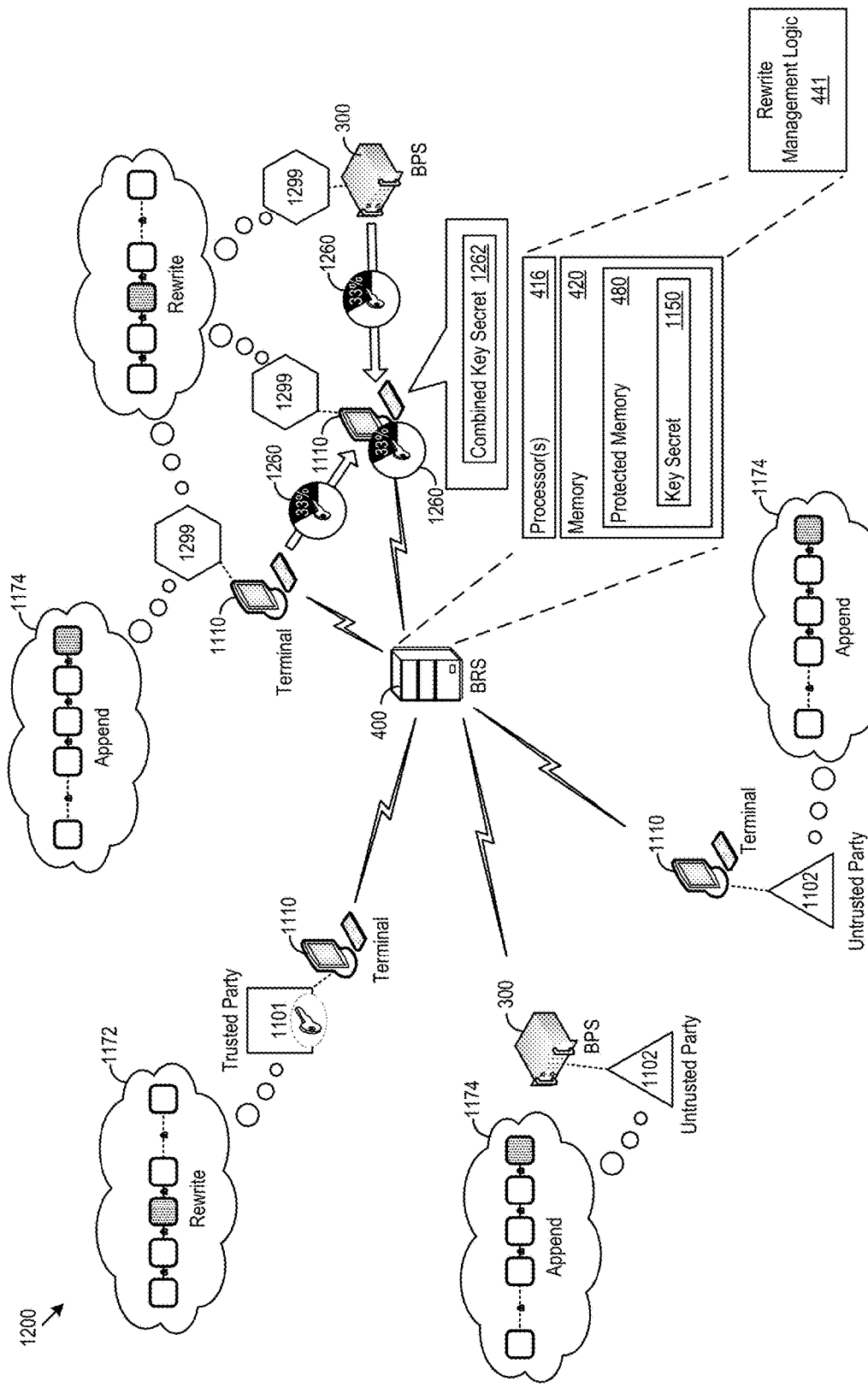
FIG. 12 shows an example distributed key secret blockchain rewrite scenario.

FIG. 12 shows an example distributed key secret blockchain rewrite scenario 1200. In the example scenario 1200, the parties may include individually untrusted parties IUPs (1299), trusted parties 1101, and untrusted parties 1102. The IUPs 1299 may be in control of portions 1260 of a key secret, while trusted parties 1101 may be in control of an entire key secret 1150. In the example scenario, rewrites 1272 may be performed when the IUPs 1299 combine their key secret portions 1260 (e.g., by PKE or other secret exchange scheme, as discussed above) or a single-party rewrite 1172 under the authority of the trusted party 1101 using its key secret 1150. However, various other example distributed key secret blockchain rewrite scenarios no single party may be in full control of a key secret 1150, and accordingly, non-tamper evident blockchain rewrites 1272 are possible when the IUPs 1299 combine their portions 1260.

Referring again to the example distributed key secret blockchain rewrite scenario 1200, the IUPs 1299 may combine their portions to perform a non-tamper-evident rewrite 1272. The IUPs 1299 may store their key secret portions 1260 on BRSs 400, BPSs 300, terminals 1110, or other memory locations. The IUPs 1299 may combine their portions using one of the exchange schemes describe above. Once the combined key secret 1262 is available, a BRS 400 may access the combined key secret 1262 to perform non-tamper-evident rewrites.

Moving now to a discussion of real world applications of rewritable blockchains, blockchain may be used (e.g., by a private company) to maintain records. For example, a service provider (e.g., a bank, financial institution, or other enterprise) may maintain a blockchain holding records of transactions.

Figure 13:
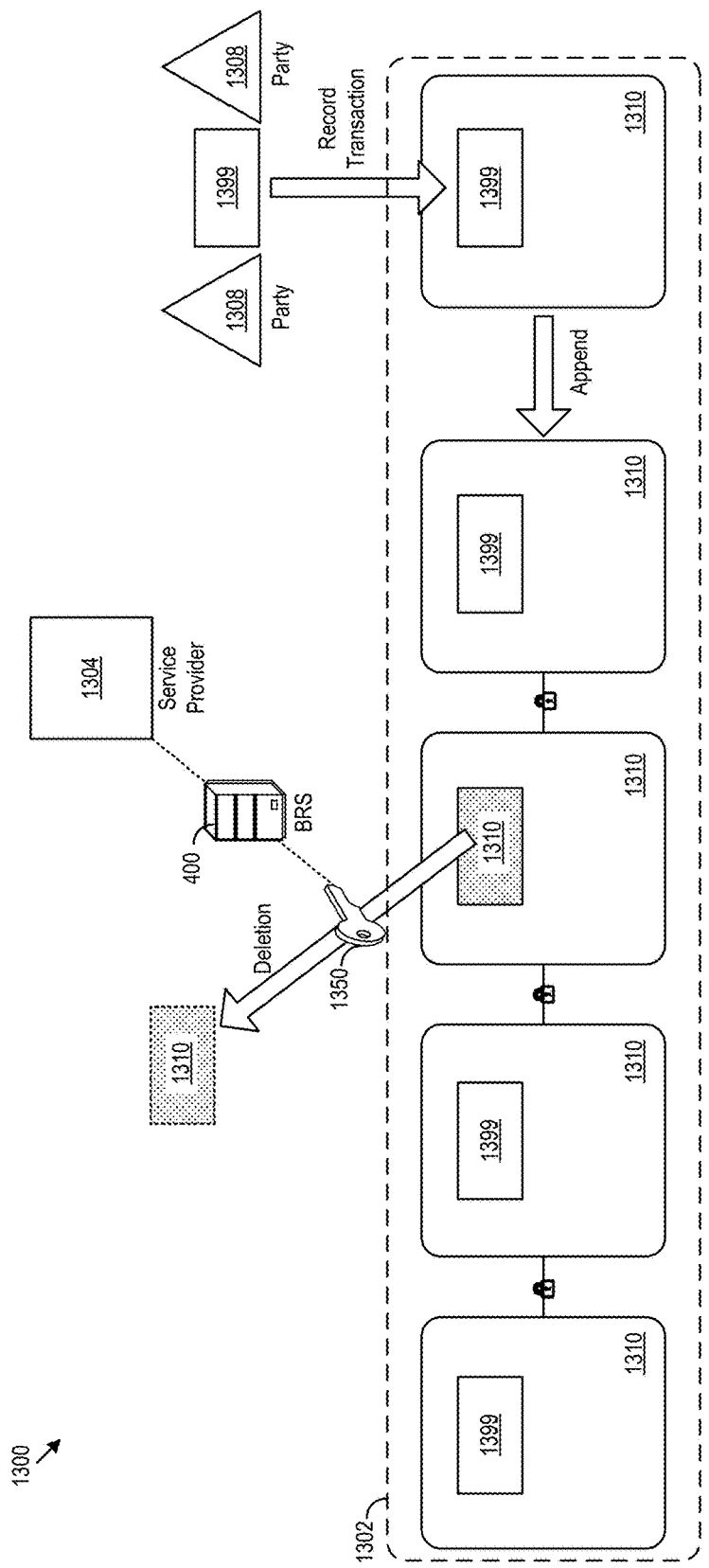
FIG. 13 shows an example blockchain record maintenance scenario.

FIG. 13 shows an example blockchain record maintenance scenario 1300. In some cases, the blockchain 1302, which can be rewritten, may be maintained by the service provider 1304 in a public location where parties 1308 to a transaction may append blocks 1310, (e.g., containing transaction records 1399) to the end of the blockchain 1302, when the parties complete transactions. The service provider 1304 holds the key secret 1350 and is a trusted party. Because parties 1308 performing transactions are untrusted, the service provider 1304 may rely the append-only nature of the blockchain to deter tampering with past records.

In some jurisdictions, such as the European Union, individuals may have a right to be forgotten. Further, because the blockchain 1302 includes transaction records 1399 and is publicly available, the blockchain 1302 may provide a public record 1398 of fraudulent activity by past users. Since individuals may have an extensive right to have references to a past crime removed from the public sphere after completing a sentence for that crime, the service provider 1304 may have a legal duty to remove the public record 1398 of fraudulent activity. If the blockchain 1302 could not be rewritten, the service provider 1304 may be forced to either invalidate the blockchain 1302 or clear the entire blockchain 1302 to comply with the law. However, since the service provider 1304 may perform non-tamper-evident rewrites to the blockchain 1302, the service provider may remove the public record 1398 without evidence of tamper that would invalidate the blockchain. Accordingly, the rewritable blockchain techniques and architectures discussed above, provide a concrete technical solution to a real-world application in public record keeping and statutory compliance.

Figure 14:
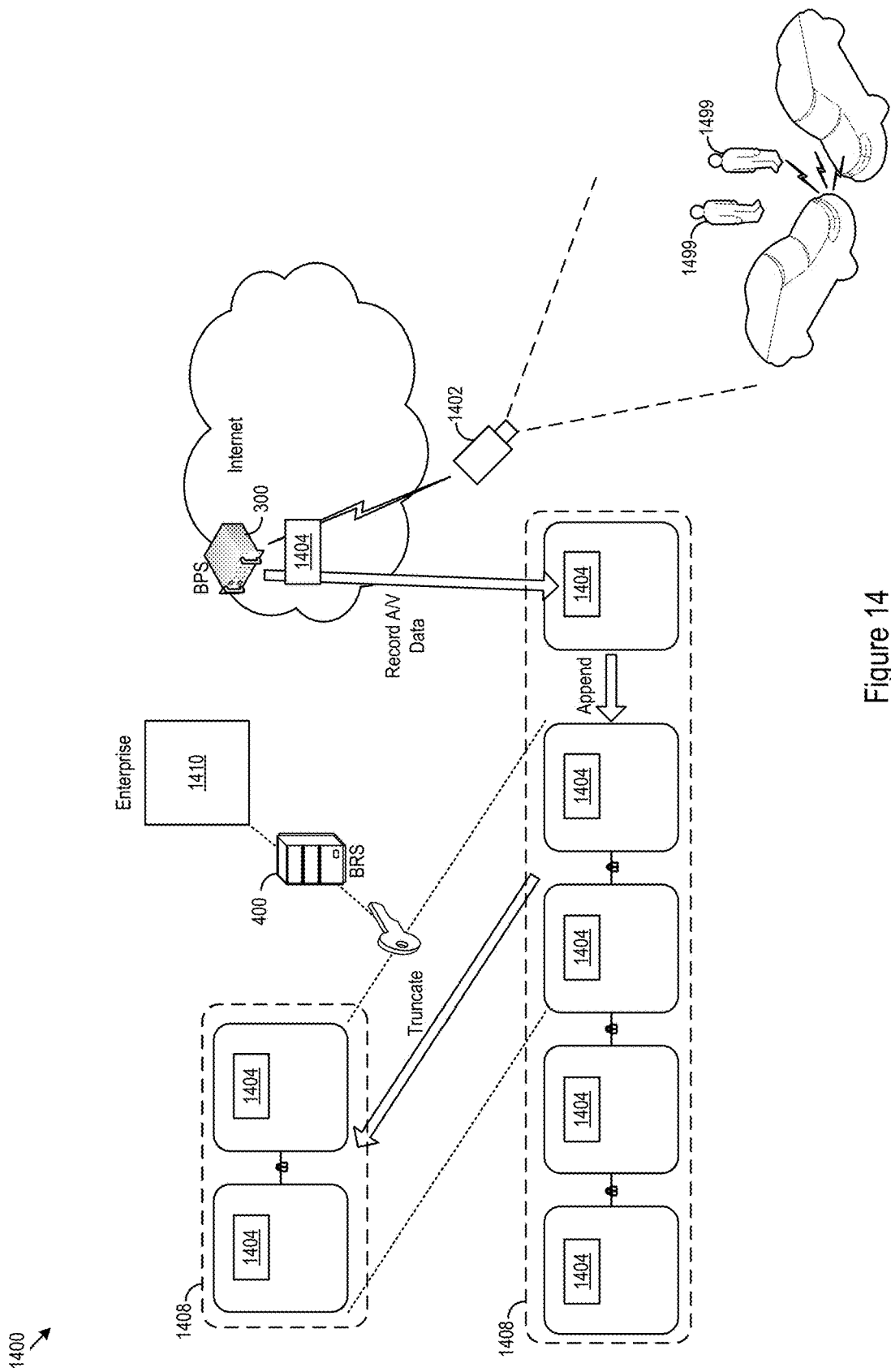
FIG. 14 shows an example internet of things rewriteable blockchain scenario.

In another real-world application, rewritable blockchains may be used in maintaining data stream records from internet of things (IoT) devices. FIG. 14 shows an example IoT rewriteable blockchain scenario 1400. An IoT security camera 1402 may record audio visual (A/V) data 1404 and store the A/V data within a rewritable blockchain 1408. An enterprise 1410 operating the IoT security camera 1402 may use it to monitor an area (e.g., a parking lot of a retail location) open to third-party clients 1499. When a dispute among the clients 1499 occurs (e.g., a minor automobile accident), the enterprise 1410 may provide the A/V data 1404 to clients 1499 within the blockchain 1408.

Accordingly, the enterprise 1410 may be confident that the individual clients 1499 are unable to alter the A/V data 1404. Thus, the authenticity of the A/V data 1404 can be verified by the clients 1499 themselves (or by virtually any party, such as an insurer, mediator, or court). As a result, providing the video within a blockchain may reduce the future potential burden on the enterprise 1410 in authenticating the A/V data 1404 for the clients 1499. Further, since the blockchain 1408 is rewritable, the enterprise may truncate the A/V data 1404 and provide a segment 1420 with the relevant A/V data. Without the ability to rewrite the blockchain 1408, the enterprise 1410 may face of choice of providing non-relevant A/V segments or removing the blockchain protection and facing the risk of more burdensome authentication requirements. In various implementations, the segments 1420 may be wrapped-up into a closed blockchain loop, as discussed below.

The rewritable blockchain techniques and architectures may support blockchain forms that are impractical or impossible without the technical solution of rewrite capabilities. For example, with blockchain rewrite support, a blockchain may be "wrapped-up" into a loop form by a trusted party. In other words, a first block of a given linear blockchain may be rewritten to include an integrity output coding-consistent with a subsequent block of the blockchain. This reforms the blockchain into a loop, at least in part. Without rewrite support constructing loops within a blockchain may be impossible or impractical unless the content of all blocks within the loop is known prior to the addition of the first block in the loop. In some cases, branching, e.g., having two separate possible blocks that could follow a first block, is an indicator of blockchain invalidity. Without branching, open loops, e.g. loops not connecting two ends of a blockchain, cannot be constructed. Accordingly, open loops may be valid in implementations where the presence of branching does not necessarily invalidate a blockchain.

Where the first block is the oldest block of the blockchain and the subsequent block is the most recent block, the trusted party reforms the blockchain into a closed blockchain loop. Blockchain loops may be used by parties to provide self-consistent tamper resistance for finite length blockchains. For example, where a blockchain covers a completed series of transactions, the blockchain may be wrapped-up into a closed loop to provide a self-consistent record not necessarily dependent on future block additions for security.

Figure 15:
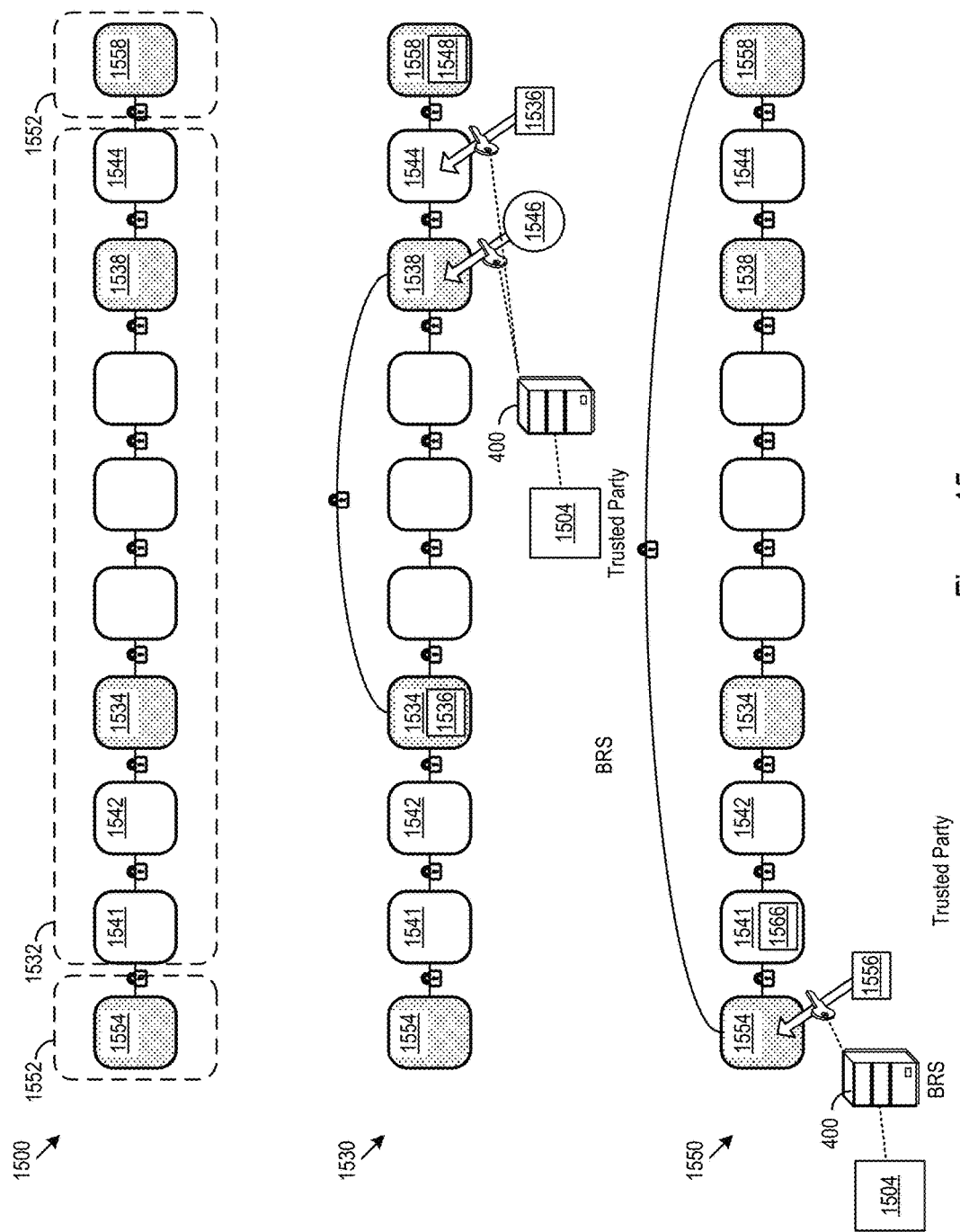
FIG. 15 shows example blockchain loops.

FIG. 15 shows example wrapped-up blockchains 1530, 1550. The example blockchain loop 1530 is an open loop. The example blockchain 1500 is a closed loop. A trusted party 1504 may wrap-up the blockchain into an open loop blockchain 1530 by selecting at least one non-end block (e.g., a block from the group 1532) to lock to another block. Alternatively, the trusted party 1504 may wrap-up the blockchain into a closed loop blockchain 1550 by selecting two end blocks (e.g., the two blocks from group 1552).

For open loop 1530, block 1538 may be rewritten with content 1546 such that the integrity output 1536 stored in block 1534 indicates that block 1538 precedes block 1534 (e.g., integrity output 1536 should be coding-consistent with content 1546). Since block 1534 remains unchanged, the content of block 1542 may also be coding-consistent with the integrity output 1536 stored in block 1534. The integrity output 1536 may be written to block 1544 to ensure that block 1538 is coding-consistent with block 1544 after being rewritten. Block 1544 may be rewritten with integrity output 1536 such that the integrity output 1548 of block 1558 remains coding-consistent with block 1544 after the rewrite.

For closed loop blockchain 1550, block 1554 may be rewritten with integrity output 1556 which indicates that block 1558 precedes block 1554 (e.g., integrity output 1556 should be coding-consistent with content 1558). Block 1554 may be rewritten with integrity output 1556 such that the integrity output 1566 of block 1541 remains coding-consistent with block 1554 after the rewrite. Accordingly, after the closed loop 1550 is created by the trusted party 1504, a rewrite block 1558 by an untrusted party of would be coding-inconsistent with integrity output 1556 and would be tamper-evident. In addition, in implementations where branching invalidates a blockchain, appending a block after block 1558 would invalidate the closed loop 1550. Accordingly, closed-loop blockchain 1550 may be protected from both non-tamper-evident rewrites and non-tamper-evident additions, in implementations where branching invalidates a blockchain.

The methods, devices, processing, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be embodied as a signal and/or data stream and/or may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may particularly include a storage medium and instructions stored in or on the medium, and the instructions when executed by the circuitry in a device may cause the device to implement any of the processing described above or illustrated in the drawings.

The implementations may be distributed as circuitry, e.g., hardware, and/or a combination of hardware and software among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

The techniques and architectures described herein may be used in various implementations. As one example, a method may be executed in a hardware security system. The method may include: receiving, at processing circuitry, a first portion of a key secret via a key secret exchange protocol; combining, with the processing circuitry, the first portion with a second portion of the key secret to obtain the key secret; determining, with the processing circuitry, to rewrite original data in a selected block of a blockchain with altered data that is different than the original data previously stored in the selected block; and determining, with the processing circuitry and using the key secret, collision data including the altered data, the collision data coding-consistent with a previously determined integrity output stored within a specific block of the blockchain that follows the selected block, the previously determined integrity output generated responsive to and coding-consistent with the original data.

As another example, a system may include: memory, a blockchain store within the memory, and rewrite circuitry in in data communication with the communication interface. The blockchain may include, a selected block including original data; and a specific block including an integrity output, the integrity output determined using the original data as an input. The communication interface may be configured to: perform a key secret exchange operation to receive portions of a key secret, the portions sent by multiple individually untrusted parties; receive a command coordinated with the key secret exchange protocol, the command to overwrite the original data with altered data. The rewrite circuitry may be configured to: obtain a portion combination using the portions of the key secret; when a count of the portions exceeds a threshold count for rewrite privileges: computing collision data that includes the altered data: the collision data coding-consistent with the integrity output, and the computing the collision data performed using the portion combination and the altered data as inputs.

In some implementations, the rewrite circuitry may be further configured to fail to compute the collision data, when the count does not exceed the threshold count for rewrite privileges.

In some implementations, the rewrite circuitry may be configured to fail to compute the collision data by: determining that the count does not exceed the threshold; and responsive to determining that the count does not exceed the threshold, forgoing computation of the collision data.

In some implementations, the rewrite circuitry may be configured to: fail to compute the collision data by generating invalid data by attempting to compute the collision data with incomplete knowledge of the key secret, the invalid data coding-inconsistent with integrity output; and perform a tamper-evident rewrite of the blockchain by overwriting at least the original data with the invalid data.

In some implementations, the specific block may follow the selected block within the blockchain.

In some implementations, the specific block may include a block adjacent to the selected block within the blockchain.

In yet another example, a method may be executed in a hardware security system. The method may include: determining, with processing circuitry, to rewrite original data in a selected block of a blockchain with altered data different than the original data previously stored in the selected block; identifying a specific block of the blockchain, the specific block including: a first integrity code and a second integrity code; determining, with the processing circuitry and using a key secret, collision data including the altered data; and performing, with the processing circuitry, a tamper-evident rewrite of the blockchain by replacing the original data with the collision data. The collision data being coding-consistent with a first integrity output stored within the specific block of the blockchain; and coding-inconsistent with the second integrity output stored within the specific block. The first and second integrity outputs generated responsive to and coding-consistent with the original data.

In another example, a system may include: memory, a blockchain stored within the memory, and rewrite circuitry. The blockchain may include: a first block including original data; and a second block including: a first integrity output computed using the original data as an input; and a second integrity output computed using the original data as an input. The rewrite circuitry may be configured to: generate a scar in the blockchain by rewriting the first block with altered data different than the original data, the altered data coding-consistent with the first integrity output but coding-inconsistent with the second integrity output.

In another example, a system may include: memory, communication interface circuitry, and rewrite circuitry in data communication with the communication interface and the memory. The memory may be configured to store a key secret for a chameleon hash that secures a blockchain. The communication interface circuitry may be configured to: access the blockchain in the memory, the blockchain including: a selected block, a second block subsequent to the selected block on the blockchain, and a third block preceding the selected block on the blockchain. The selected block may include: a payload field operable to store original data; a first previous-hash field operable to store a first chameleon hash output; and a randomness field. The second block may include a second previous-hash field operable to store a second chameleon hash output. The first chameleon hash output may be generated using content of the third block as an input. The communication interface circuitry may be further configured to: receive a trusted-party instruction to perform a non-tamper-evident rewrite to the payload field, the instruction specifying altered data which will replace the original data previously stored in the payload field; receive, to facilitate performance of the instruction, an authorization to access the key secret within the memory, the authorization initiated by a trusted party for the blockchain; and send a rewrite instruction for the blockchain. The rewrite circuitry may be configured to: using the payload field, the first previous-hash field, and the key secret as inputs, determine randomness data to write to the randomness field, the randomness data selected such that the second chameleon hash output is coding-consistent with the selected block when the payload field contains the altered data and the randomness field contains the randomness data; an generate the rewrite instruction; and cause the communication interface to send the rewrite instruction. The rewrite instruction may include: a first command to write the randomness data into the randomness field; and a second command to replace the original data with the altered data.

In another example, a system may include memory and rewrite circuitry. The memory may be configured to store a blockchain. The blockchain may include a selected block including original data; and a specific block including an integrity output. The rewrite circuitry may be configured to perform a non-tamper-evident rewrite of the selected block, the specific block, or both.

In some implementations, the rewrite circuitry may be configured to perform the non-tamper-evident rewrite by wrapping-up the blockchain into a loop.

In some implementations, rewrite circuitry may be configured to wrap-up the blockchain into the loop, by replacing the original data with altered data coding-consistent with the integrity output.

In some implementations, the rewrite circuitry may be configured to wrap-up the blockchain into the loop by wrapping-up the blockchain into a closed loop, an open loop, or both.

In some implementations, the blockchain may include a tertiary portion and a core portion.

In another example, a system may include memory and a hybrid blockchain stored on the memory. The hybrid blockchain may include a core portion; and a tertiary portion. Meeting a criterion for rewrite privileges may qualify a party to rewrite the tertiary portion but not the core portion.

In some implementations, the criterion may include combining a first threshold number of key secret portions.

In some implementations, the core portion may be secured by an integrity code that lacks an associated key secret.

In another example, a system may comprise: memory; a blockchain stored in the memory, the blockchain comprising a block with original data, the blockchain secured by a first integrity output for a first integrity code, the first integrity code is configured to yield the first integrity output when applied to the original data; and rewrite circuitry in data communication with the memory, the rewrite circuitry configured to: access the blockchain; access a key secret for the first integrity code, the key secret facilitating identification of collision data, the collision data different from the original data, the first integrity code is configured to yield the first integrity output when applied to the collision data; receive a command to rewrite the original data in the block with altered data that is different than the original data, the first integrity code does not yield the first integrity output when applied to the altered data; generate additional data responsive to the key secret and the altered data; generate the collision data based on the altered data and the additional data; and rewrite the block with the collision data.

In some implementations, the altered data comprises a redacted version of the original data, supplemental data relative to the original data, or both.

In some implementations, where the first integrity code comprises a cryptographic hash, a chameleon hash, or both.

In some implementations, the blockchain comprises a dual chain constructed from the first integrity code and a second integrity code.

In some implementations, the second integrity code does not yield a second integrity output when applied to the collision data.

In some implementations, the second integrity output is configured to act as a rewrite identifier that marks the blockchain as rewritten.

In some implementations, the first integrity code comprises a first chameleon hash; and the second integrity code comprises a rewrite-protected cryptographic hash, a second chameleon hash, or both.

In some implementations, the first integrity code comprises an inner hash nested within an outer hash.

In some implementations, the inner hash comprises a chameleon hash that is configured to provide a hash output to the outer hash; and the outer hash comprises a rewrite-protected cryptographic hash.

In some implementations, the rewrite circuitry is configured to access the key secret by combining multiple portions of the key secret.

In some implementations, the multiple portions are stored in separate memory locations maintained by individually-untrusted parties that together makeup a trusted party.

In some implementations, where the rewrite circuitry is configured to combine the multiple portions using a public-key exchange protocol.

In another example, a method comprises: in a hardware security system: accessing, using processing circuitry, a key secret for a blockchain; determining, with the processing circuitry, to rewrite original data in a selected block of the blockchain with altered data that is different than the original data previously stored in the selected block; and determining, with the processing circuitry and using the key secret, collision data including the altered data, the collision data coding-consistent with a previously determined integrity output stored within a specific block of the blockchain that follows the selected block, the previously determined integrity output generated responsive to and coding-consistent with the original data.

In some implementations, rewriting the original data with the altered data comprises rewriting the original data with a redacted version of the original data, rewriting the original data with supplemental data relative to the original data, or both.

In some implementations, the blockchain is secured by an integrity code comprising a cryptographic hash, a chameleon hash, or both; and the key secret is specific to the integrity code.

In some implementations, the blockchain comprises a dual chain that uses a first integrity code and a second integrity code.

In some implementations, the altered data comprises a coding-inconsistency with a second integrity output of the second integrity code, the second integrity output different than the previously determined integrity output.

In some implementations, the coding-inconsistency with the second integrity output of the second integrity code is configured to act as a rewrite identifier that marks the blockchain as rewritten.

In some implementations, the first integrity code comprises a first chameleon hash; and the second integrity code comprises a rewrite-protected cryptographic hash, a second chameleon hash, or both.

In some implementations, the first integrity code comprises an inner hash nested within an outer hash.

In some implementations, the inner hash comprises a chameleon hash configured to provide a hash output to the outer hash; and the outer hash comprises a rewrite-protected cryptographic hash.

In some implementations, accessing the key secret comprises combining multiple portions of the key secret.

In another example a computer program or product may include: a machine-readable medium other than a transitory signal; and instructions stored on the machine-readable medium. The instructions may, when executed, cause a system to: access original data within a blockchain, the original data secured by a first integrity output for an integrity code that is configured to yield the first integrity output when applied to the original data; determine to rewrite the original data in the block with altered data different than the original data, such that rewriting the original data with the altered data produces a tamper-evident rewrite; access a key secret in memory; and responsive to the key secret, execute a non-tamper-evident rewrite of the blockchain that replaces the first data with at least the altered data such that the integrity code is configured to yield the first integrity output when applied to the non-tamper-evident rewrite.

In some implementations, the altered data includes a redacted version of the original data, supplemental data relative to the original data, or any combination thereof.

In some implementations, the integrity code includes a chameleon hash.

In some implementations, the instructions are further configured to access the key secret by combining multiple portions of the key secret.

In some implementations, the multiple portions are stored in separate memory locations maintained by individually-untrusted parties that together makeup a trusted party for the blockchain.

In some implementations, the instructions are further configured to prevent the individually-untrusted parties from individually obtaining knowledge of an entirety of the key secret by combining the multiple portions using a public-key exchange protocol.

In another example, a method includes accessing, via rewrite circuitry, a blockchain stored on memory, where the blockchain includes a block with first data; and the blockchain is secured by a first integrity output for an integrity code that is configured to yield the first integrity output when applied to the original data. The method may further include: accessing, via the rewrite circuitry, a key secret for the integrity code, the key secret facilitating identification of collision data different from the original data, the integrity code is configured to yield the first integrity output when applied to the collision data; determining to rewrite the original data in the block with altered data different than the original data, the integrity code does not yield the first integrity output when applied to the altered data; generating additional data responsive to the key secret and the altered data; generating collision data based on the altered data and the additional data; and rewriting the block with the collision data.

In some implementations accessing the key secret includes combining multiple portions of the key secret, the multiple portions stored in separate memory locations maintained by individually-untrusted parties that together makeup a trusted party.

In another example, a method includes, in a hardware security system: accessing, using processing circuitry, a key secret for a blockchain; determining, with the processing circuitry, to rewrite original data in a selected block of the blockchain with altered data that is different than the original data previously stored in the selected block; and determining, with the processing circuitry and using the key secret, collision data including the altered data, the collision data coding-consistent with a previously determined integrity output stored within a specific block of the blockchain that follows the selected block, the previously determined integrity output generated responsive to and coding-consistent with the original data.

In some implementations, the blockchain is secured by an integrity code including a cryptographic hash, a chameleon hash, or both. The key secret is specific to the integrity code.

In some implementations, the blockchain includes a dual chain that uses a first integrity code and a second integrity code.

In some implementations, the altered data includes a coding-inconsistency with a second integrity output of the second integrity code, the second integrity output different than the previously determined integrity output.

In some implementations, the coding-inconsistency with the second integrity output of the second integrity code is configured to act as a rewrite identifier that marks the blockchain as rewritten.

In some implementations: the first integrity code includes a first chameleon hash; and the second integrity code includes a rewrite-protected cryptographic hash, a second chameleon hash, or both.

In some implementations, the first integrity code includes an inner hash nested within an outer hash.

In some implementations: the inner hash includes a chameleon hash configured to provide a hash output to the outer hash; and the outer hash includes a rewrite-protected cryptographic hash.

In another example, a system includes communication interface circuitry and rewrite circuitry in data communication with the communication interface circuitry. The communication interface circuitry is configured to receive, at processing circuitry, a first portion of a key secret via a key secret exchange protocol. The rewrite circuitry is configured to: combine the first portion with a second portion of the key secret to obtain the key secret; determine to rewrite original data in a selected block of a blockchain with altered data that is different than the original data previously stored in the selected block; and determine, using the key secret, collision data including the altered data, the collision data coding-consistent with a previously determined integrity output stored within a specific block of the blockchain that follows the selected block, the previously determined integrity output generated responsive to and coding-consistent with the original data.

In some implementations, the specific block follows the selected block within the blockchain.

In some implementations, the specific block includes a block adjacent to the selected block within the blockchain.

In some implementations, the communication interface circuitry is configured to receive the first portion of the key secret via the key secret exchange protocol by receiving the first portion of the key secret via a public key exchange protocol.

In some implementations, the communication interface circuitry is configured to receive the first portion of the key secret the key secret exchange protocol by performing the key secret exchange protocol under authority of multiple individually untrusted parties.

In some implementations, the rewrite circuitry is further configured to access the second portion of the key secret in a protected memory prior to combining the first and second portions of the key secret.

In some implementations, the rewrite circuitry is further configured to grant, using the key secret, a third portion of the key secret to a previously untrusted party.

In some implementations, the rewrite circuitry is configured to grant the third portion of the key secret by decrypting, using the key secret, a cache storing multiple portions of the key secret.

In some implementations, the rewrite circuitry is configured to determine to rewrite the original data in the selected block of the blockchain with the altered data by determining to remove a detectable rewrite artifact left by performing a rewrite without access to the first portion, the second portion, or both.

In another example, a method includes: accessing, in memory, a blockchain including: a selected block including original data; and a specific block including an integrity output, the integrity output determined from the original data as an input. The method may further include, at communication interference circuitry: performing a key secret exchange operation to receive portions of a key secret, the portions sent by multiple individually untrusted parties; receiving a command coordinated with the key secret exchange operation, the command specifying to overwrite the original data with altered data. The method may further include, at rewrite circuitry: obtaining a portion combination from the portions of the key secret; and when a count of the portions exceeds a rewriting threshold for rewrite privileges, computing collision data that includes the altered data, where: the collision data is coding-consistent with the integrity output, and collision data is algorithmically determined from the portion combination and the altered data as inputs.

In some implementations, the method further includes failing to compute the collision data, when the count does not exceed the rewriting threshold for rewrite privileges.

In some implementations, failing to compute the collision data includes: determining that the count does not exceed the rewriting threshold; and responsive to determining that the count does not exceed the rewriting threshold, forgoing computation of the collision data.

In some implementations, failing to compute the collision data includes: generating invalid data by attempting to compute the collision data with incomplete knowledge of the key secret, the invalid data coding-inconsistent with integrity output; and performing a tamper-evident rewrite of the blockchain includes overwriting at least the original data with the invalid data.

In some implementations, the method further includes decrypting a cache of key secret portions when the count exceeds a granting threshold for key secret granting privileges.

In another example, a method comprises: in a hardware security system: receiving, at processing circuitry, a first portion of a key secret via a key secret exchange protocol; combining, with the processing circuitry, the first portion with a second portion of the key secret to obtain the key secret; determining, with the processing circuitry, to rewrite original data in a selected block of a blockchain with altered data that is different than the original data previously stored in the selected block; and determining, with the processing circuitry and using the key secret, collision data including the altered data, the collision data coding-consistent with a previously determined integrity output stored within a specific block of the blockchain that follows the selected block, the previously determined integrity output generated responsive to and coding-consistent with the original data.

In some implementations, the specific block follows the selected block within the blockchain.

In some implementations, the specific block comprises a block adjacent to the selected block within the blockchain.

In some implementations, receiving the first portion of the key secret via the key secret exchange protocol comprises: receiving the first portion of the key secret via a public key exchange protocol.

In some implementations, receiving the first portion of the key secret the key secret exchange protocol comprises: performing the key secret exchange protocol under authority of multiple individually-untrusted parties.

In some implementations, the method further comprises: accessing the second portion of the key secret in a protected memory prior to combining the first and second portions of the key secret.

In some implementations, the method further comprises: granting, using the key secret, a third portion of the key secret to a previously untrusted party.

In some implementations, granting the third portion of the key secret comprises: decrypting, using the key secret, a cache storing multiple portions of the key secret.

In some implementations, determining to rewrite the original data in the selected block of the blockchain with the altered data comprises: determining to remove a detectable rewrite artifact left by performing a rewrite without access to the first portion, the second portion, or both.

In another example, a system comprises: a memory; a blockchain stored within the memory, the blockchain comprising: a selected block comprising original data; and a specific block comprising an integrity output, the integrity output determined from the original data as an input; communication interface circuitry configured to: perform a key secret exchange operation to receive portions of a key secret, the portions received on behalf of multiple individually untrusted parties; receive a command coordinated with the key secret exchange operation, the command specifying to overwrite the original data with altered data; and rewrite circuitry in data communication with the communication interface circuitry, the rewrite circuitry configured to: obtain a portion combination from the portions of the key secret; and when a count of the portions exceeds a rewriting threshold for rewrite privileges: compute collision data that includes the altered data, where: the collision data is coding-consistent with the integrity output, and the collision data is algorithmically determined from the portion combination and the altered data as inputs.

In some implementations, the rewrite circuitry is further configured to fail to compute the collision data when the count does not exceed the rewriting threshold for rewrite privileges.

In some implementations, the rewrite circuitry is configured to fail to compute the collision data by: determining that the count does not exceed the rewriting threshold; and responsive to determining that the count does not exceed the rewriting threshold, forgoing computation of the collision data.

In some implementations, the rewrite circuitry is configured to: fail to compute the collision data by generating invalid data by attempting to compute the collision data with incomplete knowledge of the key secret, the invalid data coding-inconsistent with integrity output; and perform a tamper-evident rewrite of the blockchain by overwriting at least the original data with the invalid data.

In some implementations, the specific block comprises a block adjacent to the selected block within the blockchain.

In some implementations, the rewrite circuitry is further configured to decrypt a cache of key secret portions when the count exceeds a granting threshold for key secret granting privileges.

In another example, a method includes, in a hardware security system: accessing a blockchain stored in memory, the blockchain including a first block including original data; and a second block including: a first integrity output computed using the original data as an input; and a second integrity output computed using the original data as an input. The method further includes generating, using rewrite circuitry, a rewrite artifact in the blockchain by rewriting the first block with altered data different than the original data, the altered data coding-consistent with the first integrity output but coding-inconsistent with the second integrity output.

In some implementations, generating the rewrite artifact in the blockchain includes rewriting the first block with the altered data by performing a valid rewrite of the blockchain.

In some implementations, the method further includes removing the rewrite artifact by rewriting the first block with ratification data using a ratification key secret, the ratification data coding-consistent with the first integrity output and the second integrity output.

In some implementations, the ratification data includes the altered data; and rewriting the first block with the ratification data by performing a multiple trusted-party rewrite ratification for the blockchain.

In some implementations, rewriting the first block with the altered data includes rewriting the first block with the altered data using a key secret; and the method further includes, generating the key secret by combining multiple portions of the key secret in a key secret exchange prior to rewriting the first block with the altered data.

In some implementations, combining the multiple portions includes combining multiple portions when a count of the multiple portions exceeds a first threshold for valid tamper-evident rewrites.

In some implementations, combining the multiple portions includes combining multiple portions when a count of the multiple portions exceeds a first threshold for valid tamper-evident rewrites but does not exceed a second threshold for valid non-tamper evident rewrites coding-consistent with the second integrity output.

In another example, a computer program or product includes: a machine-readable medium, other than a transitory signal; and instructions stored on the machine-readable medium, the instructions configured to, when executed, cause a system to: determine to rewrite original data in a selected block of a blockchain with altered data different than the original data previously stored in the selected block; identify a specific block of the blockchain, the specific block including: a first integrity output and a second integrity output; determine, using a first key secret, collision data including the altered data; and perform a tamper-evident rewrite of the blockchain by replacing the original data with the collision data. Where the collision data is coding-consistent with the first integrity output, and is coding-inconsistent with the second integrity output, the first and second integrity outputs generated responsive to and coding-consistent with the original data.

In some implementations, the instructions are configured to cause the processing circuitry to perform the tamper-evident rewrite coding-consistent with the first integrity output by performing a valid rewrite of the blockchain.

In some implementations, the instructions are configured to cause the processing circuitry to perform the tamper-evident rewrite coding-inconsistent with the second integrity output by generating a rewrite artifact that marks the blockchain as rewritten.

In some implementations, the instructions are further configured to cause the processing circuitry to determine to rewrite the collision data with ratification data using a second key secret after performing the tamper-evident rewrite of the blockchain, the ratification data coding-consistent with the first integrity output and the second integrity output.

In some implementations, the ratification data includes the altered data; and the instructions are configured to cause the processing circuitry to determine to rewrite the collision data with the ratification data by determining to perform a multiple trusted-party ratification of the tamper-evident rewrite of the blockchain.

In some implementations, the instructions are further configured to cause the processing circuitry to generate the first key secret by combining multiple portions of the first key secret in a key secret exchange.

In some implementations, the instructions are configured to cause the processing circuitry to combine the multiple portions by combining multiple portions when a count of the multiple portions exceeds a first threshold for valid tamper-evident rewrites.

In some implementations, the instructions are configured to cause the processing circuitry to combine the multiple portions by combining multiple portions when a count of the multiple portions exceeds a first threshold for valid tamper-evident rewrites but does not exceed a second threshold for valid non-tamper evident rewrites coding-consistent with the second integrity output.

In another example, a method comprises: in a hardware security system: determining, with processing circuitry, to rewrite original data in a selected block of a blockchain with altered data different than the original data previously stored in the selected block; identifying a specific block of the blockchain, the specific block comprising: a first integrity output and a second integrity output; determining, with the processing circuitry and using a first key secret, collision data including the altered data, the collision data: coding-consistent with the first integrity output; and coding-inconsistent with the second integrity output, the first and second integrity outputs generated responsive to and coding-consistent with the original data; and performing, with the processing circuitry, a tamper-evident rewrite of the blockchain by replacing the original data with the collision data.

In some implementations, performing the tamper-evident rewrite coding-consistent with the first integrity output comprises performing a valid rewrite of the blockchain.

In some implementations, performing the tamper-evident rewrite coding-inconsistent with the second integrity output comprises generating a rewrite artifact that marks the blockchain as rewritten.

In some implementations, the method further comprises: after performing the tamper-evident rewrite of the blockchain, determining to rewrite the collision data with ratification data using a second key secret, the ratification data coding-consistent with the first integrity output and the second integrity output.

In some implementations, the ratification data includes the altered data; and determining to rewrite the collision data with the ratification data comprises determining to perform a multiple trusted-party ratification of the tamper-evident rewrite of the blockchain.

In some implementations, the method further comprises: generating the first key secret by combining multiple portions of the first key secret in a key secret exchange.

In some implementations, combining the multiple portions comprises combining multiple portions when a count of the multiple portions exceeds a first threshold for valid tamper-evident rewrites.

In some implementations, combining the multiple portions comprises combining multiple portions when a count of the multiple portions exceeds a first threshold for valid tamper-evident rewrites but does not exceed a second threshold for valid non-tamper evident rewrites.

In another example, a system comprises: memory; a blockchain stored within the memory, the blockchain comprising: a first block comprising original data; and a second block comprising: a first integrity output computed using the original data as an input; and a second integrity output computed using the original data as an input; and rewrite circuitry configured to: generate a rewrite artifact in the blockchain by rewriting the first block with altered data different than the original data, the altered data coding-consistent with the first integrity output but coding-inconsistent with the second integrity output.

In some implementations, the rewrite circuitry is configured to generate the rewrite artifact in the blockchain by rewriting the first block with the altered data by performing a valid rewrite of the blockchain.

In some implementations, the rewrite circuitry is further configured to remove the rewrite artifact by rewriting the first block with ratification data using a ratification key secret, the ratification data coding-consistent with the first integrity output and the second integrity output.

In some implementations, the ratification data includes the altered data; and the rewrite circuitry is configured to rewrite the first block with the ratification data by performing a multiple trusted-party rewrite ratification for the blockchain.

In some implementations, the rewrite circuitry is configured to: rewrite the first block with the altered data using a key secret; and prior to rewriting the first block with the altered data, generate the key secret by combining multiple portions of the key secret in a key secret exchange.

In some implementations, the rewrite circuitry is configured to combine the multiple portions by combining the multiple portions when a count of the multiple portions exceeds a first threshold for valid tamper-evident rewrites.

In some implementations, the rewrite circuitry is configured to combine the multiple portions by combining the multiple portions when a count of the multiple portions exceeds a first threshold for valid tamper-evident rewrites but does not exceed a second threshold for valid non-tamper evident rewrites coding-consistent with the second integrity output.

In another example, a method includes, in a hardware security system: accessing, via communication interface circuitry, a blockchain database configured to store a blockchain secured by a chameleon hash, the blockchain including: a selected block including: a payload field; and a randomness field; a specific block subsequent to the selected block on the blockchain, the specific block including a first previous-hash field operable to store a first chameleon hash output; and an intermediate block between the selected block and the specific block on the blockchain, the first chameleon hash output generated using content of the intermediate block as an input. The method further includes, in the hardware security system: receiving a trusted-party instruction to delete the intermediate block from the blockchain; receiving, to facilitate performance of the instruction, an authorization to access a key secret for the chameleon hash, the authorization initiated by a trusted party for the blockchain; using the payload field, the first previous-hash field, and the key secret as inputs, determining randomness data to write to the randomness field, the randomness data selected such that the chameleon hash is configured to yield the first chameleon hash output is when: the intermediate block is deleted from the blockchain; and the chameleon hash is applied to the selected block. The method further includes: generating, at rewrite circuitry, a delete instruction; and sending, to the blockchain database and via communication interface circuitry, the delete instruction. The delete instruction includes: a first command to write the randomness data into the randomness field; and a second command to delete the intermediate block from the blockchain.

In some implementations, the intermediate block includes one of multiple blocks between the selected block and the specific block on the blockchain.

In some implementations, the chameleon hash includes a rewritable cryptographic hash nested within a rewrite-protected cryptographic hash.

In some implementations, the specific block further includes a third previous-hash field, the third previous-hash field including a write-protected hash output generated using a rewrite-protected cryptographic hash that secures the blockchain in parallel with the chameleon hash.

In some implementations, the rewrite-protected cryptographic hash does not yield the write-protected hash output when: the intermediate block is deleted from the blockchain; and the rewrite-protected cryptographic hash is applied to the selected block.

In some implementations, the trusted-party includes multiple individually untrusted parties; and the method further includes combining multiple key secret portions controlled by the individually untrusted parties using a public key encryption based exchange protocol.

In some implementations, determining the randomness data includes successfully generating the randomness data when a count of the multiple key secret portions exceeds a threshold for rewrite privileges.

In some implementations, each of the multiple key secret portions contribute equally to the count.

In some implementations, a first one of the multiple key secret portions contributes more to the count than a second one of the multiple key secrets portions.

In some implementations, the randomness field is nested within the first previous-hash field within the specific block to mask existence of the randomness field.

In some implementations, sending the delete instruction includes complying with a data privacy rule.

In another example, a computer program or product includes: a machine-readable medium other than a transitory signal; and instructions stored on the machine-readable medium. The instructions are configured to, when executed, cause a system to: access a blockchain database configured to store a blockchain secured by a chameleon hash, the blockchain including: a selected block including: a payload field and a randomness field; a specific block subsequent to the selected block on the blockchain, the specific block including a first previous-hash field operable to store a first chameleon hash output; and an intermediate block between the selected block and the specific block on the blockchain, the first chameleon hash output generated using content of the intermediate block as an input. The instructions are further configured to, when executed, cause the system to: receive a trusted-party instruction to delete the intermediate block from the blockchain; receive, to facilitate performance of the instruction, an authorization to access a key secret for the chameleon hash, the authorization initiated by a trusted party for the blockchain; using the payload field, the first previous-hash field, and the key secret as inputs, determine randomness data to write to the randomness field, the randomness data selected such that the chameleon hash is configured to yield the first chameleon hash output when: the intermediate block is deleted from the blockchain; and the chameleon hash is applied to the selected block. The instructions are further configured to, when executed, cause the system to: generate a delete instruction; and send, the delete instruction to the blockchain database. The delete instruction includes: a first command to write the randomness data into the randomness field; and a second command to delete the intermediate block from the blockchain.

In another example, a system comprises: memory configured to store a key secret for a chameleon hash that secures a blockchain; communication interface circuitry configured to: access the blockchain in the memory, the blockchain comprising: a selected block comprising: a payload field operable to store original data; a first previous-hash field operable to store a first chameleon hash output; and a randomness field; a second block subsequent to the selected block on the blockchain, the second block comprising a second previous-hash field operable to store a second chameleon hash output; and a third block preceding the selected block on the blockchain, the first chameleon hash output generated using content of the third block as an input; receive a trusted-party instruction to perform a non-tamper-evident rewrite to the payload field, the trusted-party instruction specifying altered data to replace the original data previously stored in the payload field; receive, to facilitate performance of the instruction, an authorization to access the key secret within the memory, the authorization initiated by a trusted party for the blockchain; and send a rewrite instruction for the blockchain; and rewrite circuitry in data communication with the communication interface circuitry and the memory, the rewrite circuitry configured to: using the payload field, the first previous-hash field, and the key secret as inputs, determine randomness data to write to the randomness field, the randomness data selected such that the chameleon hash is configured to yield the second chameleon hash output when: the payload field contains the altered data; the randomness field contains the randomness data; and the chameleon hash is applied to the selected block; generate the rewrite instruction, the rewrite instruction comprising:

a first command to write the randomness data into the randomness field; and a second command to replace the original data with the altered data; and cause the communication interface circuitry to send the rewrite instruction.

In some implementations, the chameleon hash comprises a rewritable cryptographic hash nested within a rewrite-protected cryptographic hash.

In some implementations, the second block further comprises a third previous-hash field, the third previous-hash field comprising a write-protected hash output generated using a rewrite-protected cryptographic hash that secures the blockchain in parallel with the chameleon hash.

In some implementations, the rewrite-protected cryptographic hash does not produce the write-protected hash output when: the payload field contains the altered data; the randomness field contains the randomness data; and the rewrite-protected cryptographic hash is applied to the selected block.

In some implementations, the trusted-party comprises multiple individually untrusted parties; and the rewrite circuitry is configured to combine multiple key secret portions controlled by the individually untrusted parties using a public key encryption based exchange protocol.

In some implementations, the rewrite circuitry is configured to successfully generate the randomness data when a count of the multiple key secret portions exceeds a threshold for rewrite privileges.

In some implementations, each of the multiple key secret portions contribute equally to the count.

In some implementations, a first one of the multiple key secret portions contributes more to the count than a second one of the multiple key secrets portions.

In some implementations, the randomness field is nested within the first previous-hash field within the selected block to mask existence of the randomness field.

In some implementations, the altered data with respect to the original data comprises an addition of data to the payload field, a redaction of data from the payload field, or both.

In some implementations, the altered data with respect to the original data comprises a redaction of data from the payload field; and the rewrite circuitry is configured to replace the original data with the altered data to comply with a data privacy rule.

In some implementations, the system further comprises a trigger configured to deploy an anti-theft countermeasure when activated; and the memory comprises protected memory coupled to the trigger.

In another example, a method comprises, in a hardware security system: accessing, via communication interface circuitry, a blockchain database configured to store a blockchain secured by a chameleon hash, the blockchain comprising: a selected block comprising: a payload field operable to store original data; a first previous-hash field operable to store a first chameleon hash output; and a randomness field; a second block subsequent to the selected block on the blockchain, the second block comprising a second previous-hash field operable to store a second chameleon hash output; and a third block preceding the selected block on the blockchain, the first chameleon hash output generated using content of the third block as an input; receiving, via the communication interface circuitry, a trusted-party instruction to perform a non-tamper-evident rewrite to the payload field, the instruction specifying altered data to replace the original data previously stored in the payload field; receiving, to facilitate performance of the instruction, an authorization to access a key secret for the chameleon hash, the authorization initiated by a trusted party for the blockchain; and in rewrite circuitry of the hardware security system: using the payload field, the first previous-hash field, and the key secret as inputs, determine randomness data to write to the randomness field, the randomness data selected such that the chameleon hash is configured to yield the second chameleon hash output when: the payload field contains the altered data; the randomness field contains the randomness data; and the chameleon hash is applied to the selected block; generate a rewrite instruction, the rewrite instruction comprising: a first command to write the randomness data into the randomness field; and a second command to replace the original data with the altered data; and sending, to the blockchain database and via communication interface circuitry, the rewrite instruction.

In some implementations, the chameleon hash comprises a rewritable cryptographic hash nested within a rewrite-protected cryptographic hash.

In some implementations, the second block further comprises a third previous-hash field, the third previous-hash field comprising a write-protected hash output generated using a rewrite-protected cryptographic hash that secures the blockchain in parallel with the chameleon hash.

Various implementations have been specifically described. However, many other implementations are also possible. Headings and/or subheadings used herein are intended only to aid the reader with understanding described implementations. The invention is defined by the claims.

What is claimed is:

1. A system comprising:
a memory configured to store a data-tamper-protected blockchain,
the data-tamper-protected blockchain including multiple blocks, each of the multiple blocks data-tamper-protected by a respective integrity output stored within the data-tamper-protected blockchain, the multiple blocks including:
a subsequent block and a previous block,
the previous block including:
a previous transaction record, and
a previous integrity output, and
the subsequent block including:
a subsequent transaction record, and
the respective integrity output for the previous block; and
rewrite circuitry configured to perform, on behalf of a trusted party and without altering the respective integrity output for the previous block, a validity-preserving rewrite to the previous block of the data-tamper-protected blockchain using a key secret controlled by the trusted party.

2. The system of claim 1, where content of the previous block is coding-consistent with the respective integrity output for the previous block.

3. The system of claim 1, where:
the data-tamper-protected blockchain is secured by an integrity code comprising a cryptographic hash, a chameleon hash, or both; and
the key secret is specific to the integrity code.

4. The system of claim 3, where:
the integrity code comprises the chameleon hash nested within the cryptographic hash; and
the key secret is specific to the chameleon hash.

5. The system of claim 1, where the rewrite circuitry is configured to perform the validity-preserving rewrite by rewriting original data in the previous block with a redacted version of the original data, supplemental data relative to the original data, or both.

6. The system of claim 1, where the data-tamper-protected blockchain is secured by an integrity code configured to prevent revelation of rewrite capabilities through inspection of the data-tamper-protected blockchain.

7. The system of claim 1, where the rewrite circuitry is configured to use the validity-preserving rewrite of the previous block to effect a deletion of a specific block coding-consistent with an integrity code stored, prior to the validity-preserving rewrite, within the previous block.

8. The system of claim 1, where:
the key secret comprises multiple key secret portions that are combinable to form the key secret; and
the trusted party comprises multiple individually-untrusted parties, the individually-untrusted parties each in control an individual portion of the multiple key secret portions.

9. The system of claim 1, where the memory is further configured to store metadata configured to indicate rewritability of the data-tamper-protected blockchain.

10. The system of claim 1, where the data-tamper-protected blockchain comprises a smart contract record.

11. The system of claim 1, where the data-tamper-protected blockchain comprises a transaction record for an account.

12. A method comprising:
obtaining, at rewrite circuitry and on behalf of a trusted party, a key secret for a data-tamper-protected blockchain,
the data-tamper-protected blockchain including multiple blocks, each of the multiple blocks:
includes a respective integrity code that data-tamper protects a respective previous block in the blockchain,
is data-tamper-protected by a respective subsequent block in the blockchain, and
includes a respective transaction record; and
at the rewrite circuitry and using the key secret, performing a validity-preserving rewrite to a selected block of the multiple blocks of the data-tamper-protected blockchain.

13. The method of claim 12, where:
the data-tamper-protected blockchain is secured by an integrity code comprising a cryptographic hash, a chameleon hash, or both; and
the key secret is specific to the integrity code.

14. The method of claim 13, where:
the integrity code comprises the chameleon hash nested within the cryptographic hash; and
the key secret is specific to the chameleon hash.

15. The method of claim 12, where performing the validity-preserving rewrite comprises rewriting original data in the selected block with a redacted version of the original data, supplemental data relative to the original data, or both.

16. The method of claim 12, where the data-tamper-protected blockchain is secured by an integrity code configured to prevent revelation of rewrite capabilities through inspection of the data-tamper-protected blockchain.

17. The method of claim 12, performing the validity-preserving rewrite of the selected block comprises effecting a deletion of a specific block coding-consistent with an integrity code stored, prior to the validity-preserving rewrite, within the selected block.

18. The method of claim 12, where:
the key secret comprises multiple key secret portions that are combinable to form the key secret; and
the trusted party comprises multiple individually-untrusted parties, the individually-untrusted parties each in control an individual portion of the multiple key secret portions.

19. The method of claim 12, where the data-tamper-protected blockchain is associated with metadata configured to indicate rewritability of the data-tamper-protected blockchain.

20. The method of claim 12, where the data-tamper-protected blockchain comprises a smart contract record.

21. The method of claim 12, where the data-tamper-protected blockchain comprises a transaction record for an account.

22. A method comprising:
for a blockchain including tamper-evident content, performing, via rewrite circuitry and responsive to a command from a trusted party, a non-tamper-evident rewrite on a previous block of the blockchain that, prior to rewriting, is coding-consistent with a previous integrity output stored within a subsequent block of the blockchain, where:
the subsequent block includes a transaction record; and
the subsequent block is coding-consistent with a subsequent integrity output stored within the blockchain.

23. The method of claim 22, where performing the non-tamper-evident rewrite comprises accessing a key secret for the blockchain based on user account authority associated with the trusted party.

24. The method of claim 22, where the transaction record comprises a transaction record for an account.

25. A product comprising:
one or more machine-readable media other than a transitory signal; and
instructions stored on the one or more machine-readable media, the instructions configured to, when executed, cause a machine to:
at rewrite circuitry, obtain a key secret for a blockchain, the blockchain configured to maintain tamper-evident content, the blockchain including a series of blocks, each block of the series of blocks:
coding-consistent with a respective subsequent integrity output stored within a respective subsequent block of the blockchain;
including a respective transaction record; and
configured to store a respective previous integrity output that is coding-consistent with a respective previous block of the blockchain; and
perform, at rewrite circuitry and based on the key secret, a coding-consistent rewrite on a selected block of the series of blocks of the blockchain that, prior to rewriting, is coding-consistent with the respective subsequent integrity output for the selected block.

26. The product of claim 25, where the instructions are further configured to cause the machine to obtain the key secret by accessing the key secret based on user account authority associated with a trusted party.

27. The product of claim 25, where blockchain is associated with metadata configured to indicate rewritability of the blockchain.

28. The product of claim 25, where:
the key secret comprises multiple key secret portions that are combinable to form the key secret; and
the multiple key secret portions are controlled by multiple individually-untrusted parties, the individually-untrusted parties each in control an individual portion of the multiple key secret portions.

29. A method comprising:
obtaining, at rewrite circuitry and on behalf of a trusted party, a key secret for a data-tamper-protected blockchain,
the data-tamper-protected blockchain including multiple blocks, each of the multiple blocks:
includes a respective integrity code that data-tamper-protects a respective previous block in the blockchain,
is data-tamper-protected by a respective subsequent block in the blockchain, and
includes a respective event record; and
at the rewrite circuitry and using the key secret, performing a validity-preserving rewrite to a selected block of the multiple blocks of the data-tamper-protected blockchain.

30. A method comprising:
for a blockchain including tamper-evident content, performing, via rewrite circuitry and responsive to a command from a trusted party, a non-tamper-evident rewrite on a previous block of the blockchain that, prior to rewriting, is coding-consistent with a previous integrity output stored within a subsequent block of the blockchain, where:
the subsequent block includes an event record; and
the subsequent block is coding-consistent with a subsequent integrity output stored within the blockchain.

* * * * *